United States Patent
Neale

(10) Patent No.: US 10,377,007 B2
(45) Date of Patent: Aug. 13, 2019

(54) MANUFACTURING BYPRODUCT COLLECTION SYSTEMS AND METHODS

(71) Applicant: THE BOEING COMPANY, Chicago, IL (US)

(72) Inventor: Andrew Lawrence Neale, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 146 days.

(21) Appl. No.: 15/420,991

(22) Filed: Jan. 31, 2017

(65) Prior Publication Data

US 2018/0015581 A1 Jan. 18, 2018

Related U.S. Application Data

(63) Continuation-in-part of application No. 15/209,158, filed on Jul. 13, 2016, now Pat. No. 10,123,670.

(51) Int. Cl.

| | |
|---|---|
| *B23Q 11/00* | (2006.01) |
| *B24B 23/02* | (2006.01) |
| *A47L 5/02* | (2006.01) |
| *B24B 55/05* | (2006.01) |
| *A47L 5/38* | (2006.01) |

(52) U.S. Cl.
CPC ............ *B23Q 11/0046* (2013.01); *A47L 5/02* (2013.01); *A47L 5/38* (2013.01); *B23Q 11/0071* (2013.01); *B24B 23/02* (2013.01); *B24B 55/05* (2013.01)

(58) Field of Classification Search
CPC ... B23Q 11/0046; B23Q 11/0071; A47L 5/02; A47L 5/38; B24B 23/02; B24B 55/05

USPC .............................................. 409/137; 15/339
See application file for complete search history.

(56) References Cited

U.S. PATENT DOCUMENTS

| | | | | |
|---|---|---|---|---|
| 4,205,728 | A * | 6/1980 | Gloor | B23Q 11/0046 175/209 |
| 5,295,771 | A | 3/1994 | Wehrmann | |
| 5,527,207 | A | 6/1996 | Azar | |
| 6,053,674 | A | 4/2000 | Thompson | |
| 6,471,574 | B1 * | 10/2002 | Rupprecht | B24B 23/02 451/45 |
| 8,133,094 | B2 * | 3/2012 | Loveless | B24B 55/10 451/28 |
| 8,177,606 | B2 * | 5/2012 | Loveless | B24B 55/052 451/359 |
| 8,911,186 | B2 * | 12/2014 | Hahn | B23Q 11/0046 408/115 R |
| 9,138,845 | B2 * | 9/2015 | Hahn | A47L 7/0095 |
| 9,289,879 | B2 | 3/2016 | Copeland | |
| 2005/0119700 | A1 | 6/2005 | Klobe | |
| 2009/0181606 | A1 | 7/2009 | Loveless | |

* cited by examiner

*Primary Examiner* — David Redding
(74) *Attorney, Agent, or Firm* — Joseph M. Butscher; The Small Patent Law Group, LLC

(57) ABSTRACT

A byproduct collection system is configured to collect byproducts of a manufacturing operation on a workpiece. The byproduct collection system includes a collection shroud defining a collection chamber, and a securing mount coupled to the collection shroud. The securing mount is configured to removably secure the byproduct collection system to a surface of the workpiece so that the collection shroud is proximate to a working location of the workpiece during a working operation on the workpiece.

25 Claims, 12 Drawing Sheets

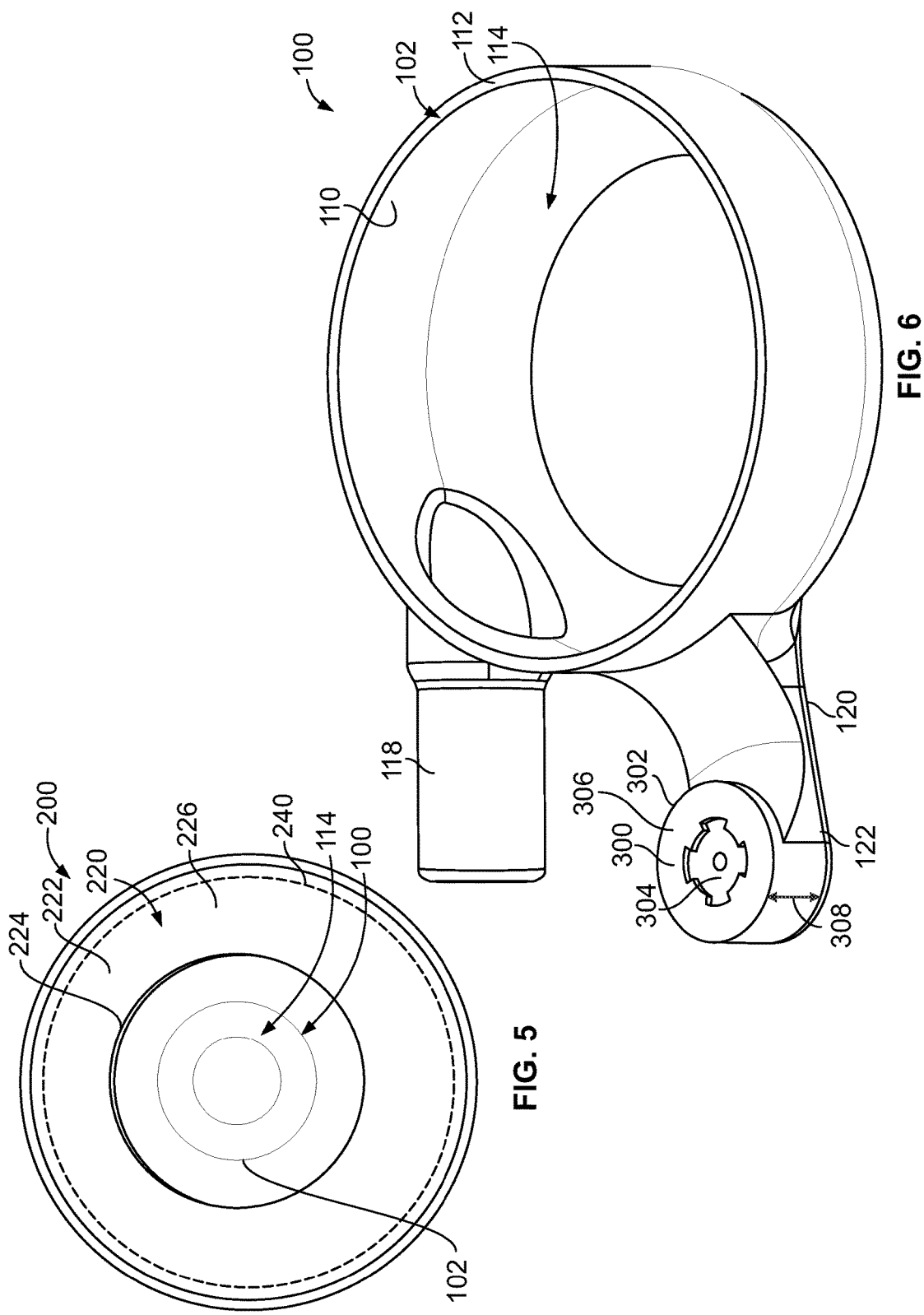

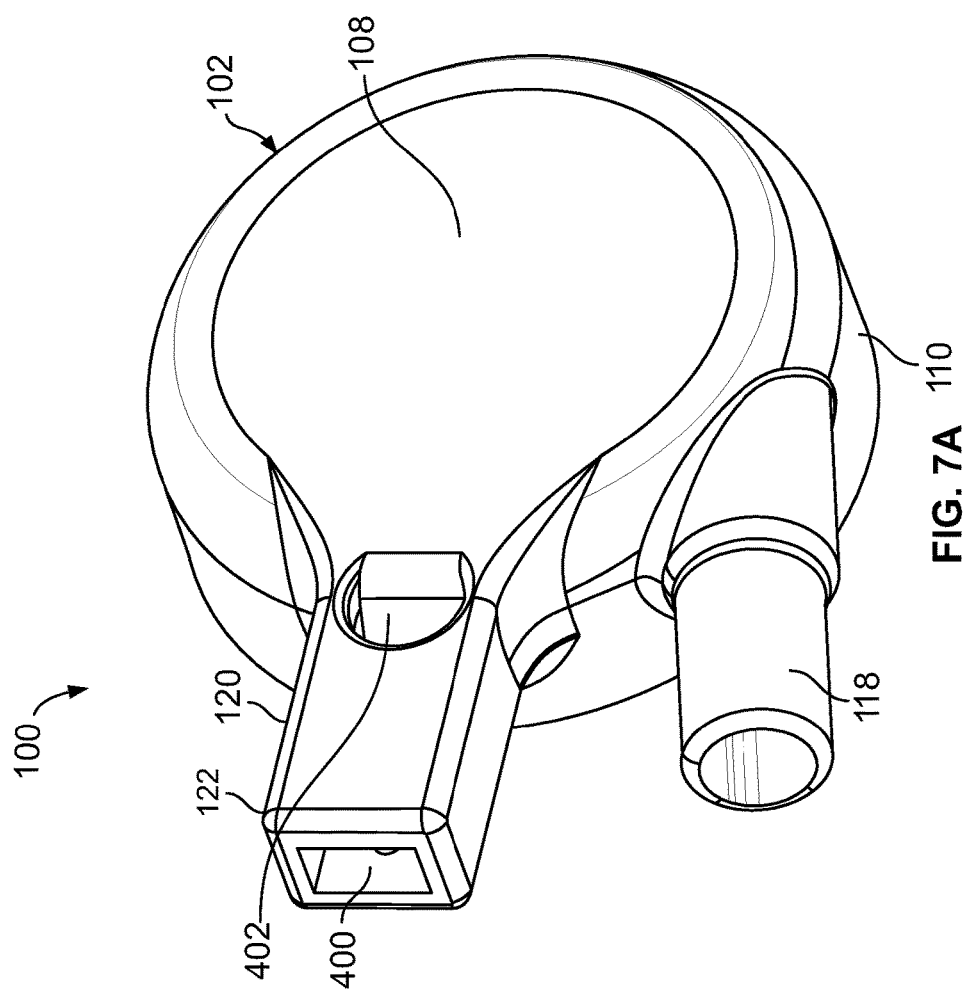
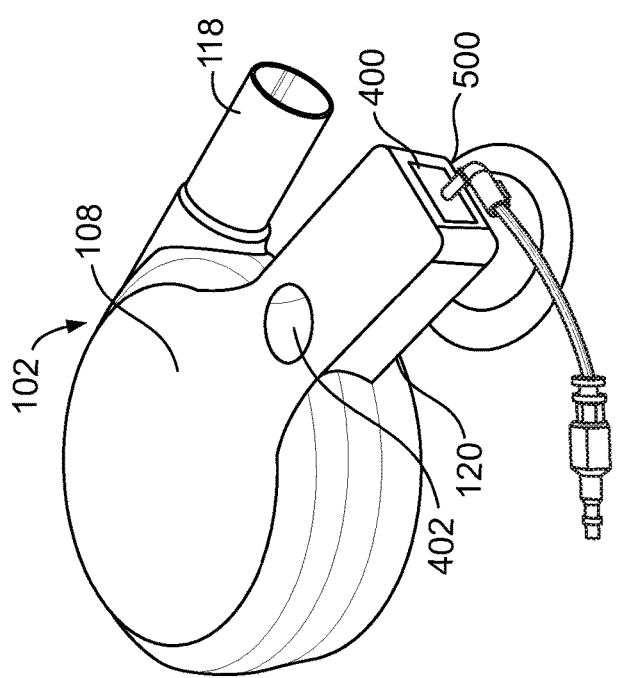
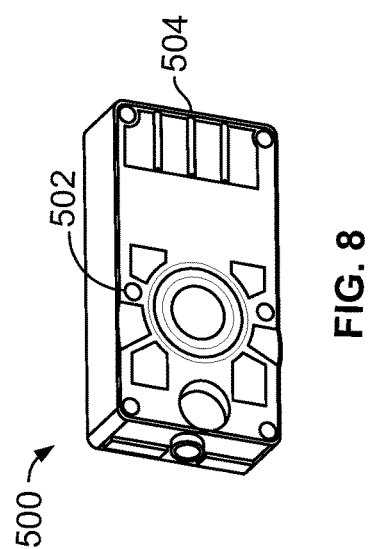
FIG. 7A
FIG. 7B
FIG. 8

MANUFACTURING BYPRODUCT COLLECTION SYSTEMS AND METHODS

RELATED APPLICATIONS

This application is a continuation-in-part of U.S. patent application Ser. No. 15/209,158, entitled "Manufacturing Byproduct Collection Systems and Methods," filed Jul. 13, 2016, which is hereby incorporated by reference in its entirety.

FIELD OF THE DISCLOSURE

Embodiments of the present disclosure generally relate to systems and methods of collecting byproducts during manufacturing operations.

BACKGROUND OF THE DISCLOSURE

During manufacturing processes for various products, tools are used to form, connect, cut, drill, grind, and the like. For example, during a manufacturing process for a wing of an aircraft, various holes may be drilled through panels. The holes are configured to receive and retain fasteners, such as bolts, to connect the panels to other components, such as frames, stringers, struts, and/or the like.

A tool, such as a drill, is used to form holes through a panel. As the drill is urged into and through a panel, byproducts such as fumes, dust, debris, and the like are generated. For example, as an operative tip of the drill is urged through the panel, debris in the form of shavings from the panel is pushed through an opposite surface of the panel. Further, during various manufacturing processes, as tools are used to engage workpieces (such as panels, frames, blocks, walls, and the like) fumes, dust, debris, and other such byproducts are generated due to engagement of the workpiece with the operating tools.

In order to collect the various byproducts generated by tools engaging workpieces, customized shrouds are adapted to be directly secured to the tools. Each shroud is specifically configured to fit to a specific tool. If the shroud is compromised, an operator typically needs to search for and find the specific, customized shroud adapted for the specific tool. In short, collection shrouds are generally specifically adapted for particular equipment and manufacturing processes, thereby increasing overall costs.

Additionally, because customized collection shrouds are typically secured directly to a tool, the shrouds are configured to collect byproducts from an operative side of the workpiece. As such, the shrouds generally do not collect byproducts from a backing side of the workpiece that is opposite from the operative side. For example, an individual may use a tool to operate on a workpiece from a front side. A specialized, customized shroud secured to the tool collects byproducts from the front side of the workpiece, as the shroud is directly connected to the tool. However, byproducts generated by the tool interacting with the workpiece may extend and pass through the rear side of the workpiece, and be deposited as foreign object debris, as the shroud is not located on the rear side.

Further, when a specialized, customized shroud is directly mounted to a tool, an overall weight of the tool is increased. Also, a shroud that is directly coupled to the tool may be obtrusive and cumbersome, and limit the mobility of the tool.

SUMMARY OF THE DISCLOSURE

A need exists for an efficient and cost-effective system and method for collecting byproducts during a manufacturing process. Further, a need exists for a system and method for collecting all or substantially all manufacturing byproducts, whether at or on an operative surface or a backing surface of a workpiece.

With those needs in mind, certain embodiments of the present disclosure provide a byproduct collection system configured to collect byproducts of a manufacturing operation on a workpiece. The byproduct collection system includes a collection shroud defining a collection chamber, and a securing mount coupled to the collection shroud. The securing mount is configured to removably secure the byproduct collection system to a first surface of the workpiece so that the collection shroud is proximate to a working location of the workpiece during a working operation on the workpiece. The working location may be on a second surface of the workpiece that is opposite from the first surface.

In at least one embodiment, the byproduct collection system includes a vacuum port extending from the collection shroud. A vacuum channel extends through the vacuum port and a portion of the collection shroud. The vacuum channel is in fluid communication with the collection chamber. The vacuum port is configured to couple to a vacuum generator.

The securing mount may include at least one suction cup that is configured to removably connect to the first surface of the workpiece. A suction generator may be coupled to the suction cup(s). In at least one embodiment, the suction generator includes a hand pump.

In at least one embodiment, a coupler outwardly extends from an outer portion of the collection shroud. The securing mount is attached to the coupler.

A standoff gap may be formed between an outer rim of the collection shroud and the first surface of the workpiece when the securing mount removably secures the byproduct collection system to the first surface of the workpiece.

Certain embodiments of the present disclosure provide a byproduct collection method for collecting byproducts of a manufacturing operation on a workpiece. The byproduct collection method includes coupling a securing mount to a collection shroud defining a collection chamber, positioning the collection shroud proximate to a working location of the workpiece, removably securing the collection shroud in relation to the workpiece with the securing mount, operating on the workpiece, and collecting the byproducts generated during the operating within the collection shroud.

The byproduct collection method may also include generating a vacuum force with a vacuum generator that is coupled to a vacuum port extending from the collection shroud. A vacuum channel extends through the vacuum port and a portion of the collection shroud. The vacuum channel is in fluid communication with the collection chamber. The byproduct collection method may also include drawing the byproducts collected within the collection shroud into the vacuum through the generating.

Certain embodiments of the present disclosure provide a system for collecting and removing manufacturing byproducts from and around a workpiece. The system includes a byproduct collection system configured to collect the manufacturing byproducts of a manufacturing operation on the workpiece, and a vacuum generator coupled to a vacuum port of the byproduct collection system through a connection conduit. The vacuum generator is configured to generate a vacuum force that draws the manufacturing byproducts into a collection chamber of a collection shroud of the byproduct collection system.

Certain embodiments of the present disclosure provide a byproduct collection system that is configured to collect byproducts of a manufacturing operation on a workpiece. The byproduct collection system includes a collection shroud defining a collection chamber, and at least one air passage port formed through the collection shroud. The air passage port(s) is configured to allow air to pass into the collection chamber.

In at least one embodiment, a cover is positioned over the air passage port(s). The cover is configured to be moved between a closed position in which the air passage port(s) is covered, and an open position in which the air passage port(s) is exposed and open. The cover may be rotationally coupled to the collection shroud, and configured to be rotated between the closed position and the open position. In at least one embodiment, the cover is secured to the collection shroud in the closed position, and removed from the collection shroud in the open position.

The byproduct collection system may include a plurality of air passages. Optionally, a single air passage port may be used that is configured to allow a portion of a tool to pass therethrough into the collection chamber.

In at least one embodiment, the collection shroud includes a base connected to a perimeter wall. The air passage port(s) may be formed through a portion of the base. The air passage port(s) may be formed through a portion of the perimeter wall. In at least one embodiment, the air passage port(s) is configured to abut against a surface of the workpiece.

In at least one embodiment, the collection shroud includes a first portion, and a second portion moveably coupled to the first portion. The first and second portions are configured to be moved between an open position and a closed position.

The first portion may be moveably coupled to the second portion through a hinge. The first portion may be configured to pivot between the open position and the closed position about a pivot axle that is perpendicular to a surface of the workpiece on which the collection shroud mounts. A latch may be used to secure the first portion to the second portion in the closed position.

In at least one embodiment, a portion of a tool is configured to be positioned between the first and second portions in the open position. The first and second portions are configured to close around the portion of the tool in the closed position.

The byproduct collection system may also include a securing mount coupled to the collection shroud. The securing mount is configured to removably secure the byproduct collection system to a first surface of the workpiece so that the collection shroud is proximate to a working location of the workpiece during a working operation on the workpiece.

The securing mount may include at least one suction cup that is configured to removably connect to the first surface of the workpiece. A suction generator may be coupled to the suction cup.

The byproduct collection system may also include a vacuum port extending from the collection shroud. A vacuum channel extends through the vacuum port and a portion of the collection shroud. The vacuum channel is in fluid communication with the collection chamber. The vacuum port is configured to couple to a vacuum generator.

Certain embodiments of the present disclosure provide a byproduct collection system that is configured to collect byproducts of a manufacturing operation on a workpiece. The byproduct collection system includes a collection shroud defining a collection chamber. The collection shroud includes a first portion, and a second portion moveably coupled to the first portion. The first and second portions are configured to be moved between an open position and a closed position.

Certain embodiments of the present disclosure provide a method for collecting byproducts of a manufacturing operation on a workpiece. The method includes positioning a collection shroud on the workpiece, opening a first portion of the collection shroud relative to a second portion of the collection shroud, positioning a portion of a tool between the opened first and second portions, closing the first and second portions around the portion of the tool, and securing the first portion to the second portion in the closed position with a latch.

BRIEF DESCRIPTION OF THE DRAWINGS

FIG. 5 is a diagrammatic representation of a front view of a portion of a workpiece, according to an embodiment of the present disclosure.

FIG. 6 is a diagrammatic representation of a lateral front perspective view of a byproduct collection system, according to an embodiment of the present disclosure.

FIG. 7A is a diagrammatic representation of a rear perspective view of a byproduct collection system, according to an embodiment of the present disclosure.

FIG. 7B is a diagrammatic representation of a rear perspective view of a byproduct collection system having an automatic suction generator, according to an embodiment of the present disclosure.

FIG. 8 is a diagrammatic representation of a rear perspective view of a suction generator, according to an embodiment of the present disclosure.

DETAILED DESCRIPTION OF THE DISCLOSURE

Figure 1:
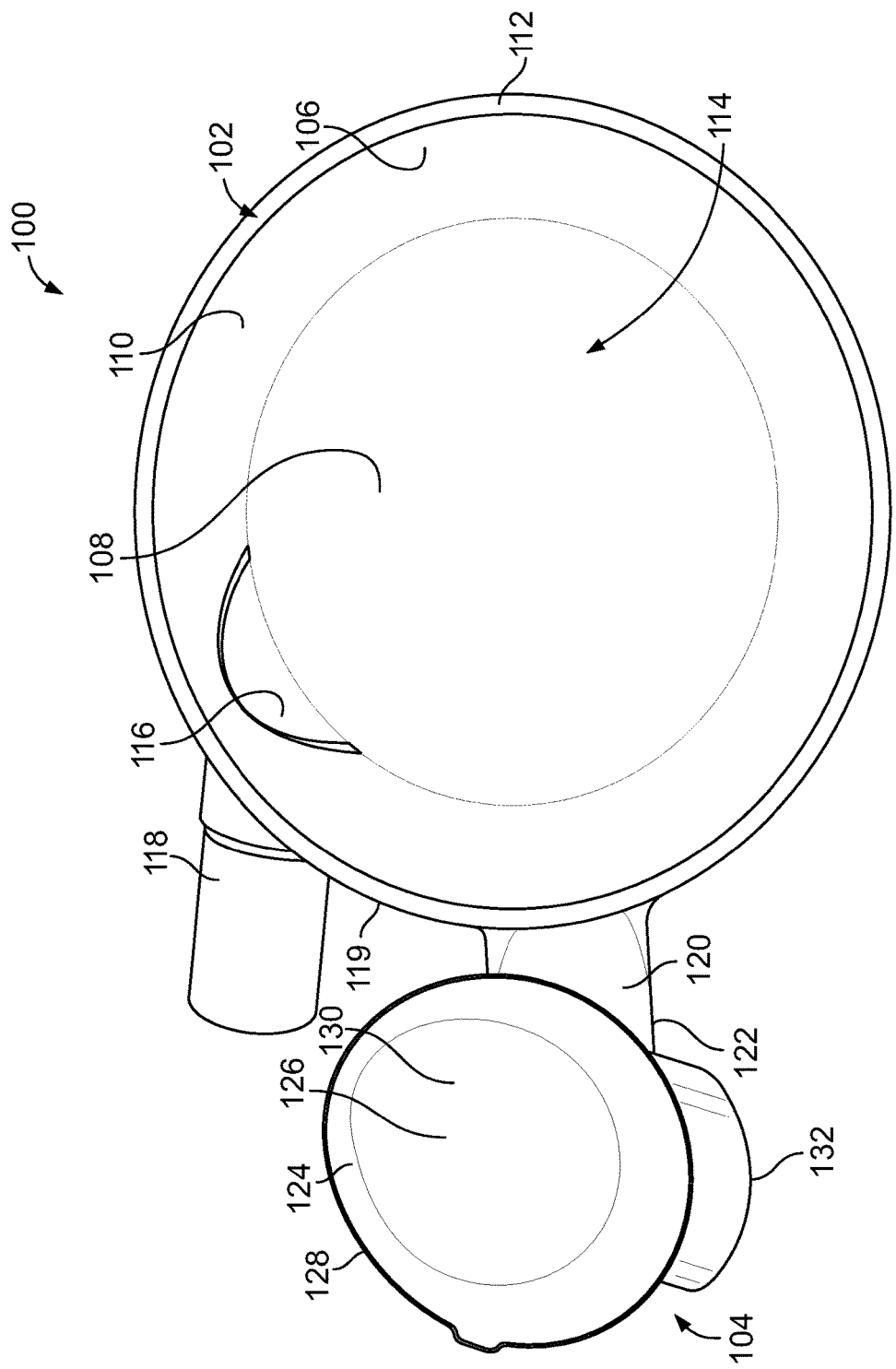
FIG. 1 is a diagrammatic representation of a front perspective view of a byproduct collection system, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a byproduct collection system that includes a suction mounted collection shroud that is configured to collect manufacturing byproducts, such as fumes, dust, and debris, which may be generated during manufacturing operations. The byproduct collection system is configured to be used in limited access and open areas. In at least one embodiment, the byproduct collection system includes a suction cup mount that is configured to attach a collection shroud to a surface of a workpiece, and allow for hands-free operation. The byproduct collection systems and methods are configured to collect manufacturing byproducts (such as fumes, dust, and debris) that may be generated during manufacturing operations (such as drilling, grinding, welding, soldering, and the like).

The byproduct collection system includes a securing mount that is configured to removably secure the byproduct collection system to a surface of a workpiece. In at least one embodiment, the securing mount includes a suction cup that is configured to removably mount the byproduct collection system to the surface of the workpiece through suction force. The byproduct collection system is configured to be secured to the workpiece and operate without intervention by an individual to collect manufacturing byproducts. The byproduct collection system may be removably secured to the workpiece in non-standard locations such, as the back side of a drilled hole to collect chips and dust generated during the drilling operation. In this manner, embodiments of the present disclosure allow for a light and unencumbered tool to be used (as a specialized shroud need not be secured to the tool). Embodiments of the present disclosure provide byproduct collection systems and methods that protect individuals working on and/or proximate a workpiece from manufacturing byproducts, such as fumes, dust, debris, and the like that may be generated by tools engaging the workpiece.

Certain embodiments of the present disclosure provide a byproduct collection system that is configured to collect byproducts of one or more manufacturing operations. The byproduct collection system includes a collection shroud that is configured to collect the byproducts. A securing mount is coupled to the collection shroud. In at least one embodiment, the securing mount suction cup includes a suction cup. The collection shroud is in fluid communication with a vacuum port. A vacuum generator is configured to operatively connect to the vacuum port through a connection conduit, such as a flexible hose, tube, or the like.

The collection shroud includes an outer rim. A standoff gap may be maintained about the outer rim when attached to a surface of a workpiece. The standoff gap provides a path for the collection of byproducts from a confined working zone about the shroud perimeter. In at least one other embodiment, the outer rim is configured to sealingly engage the surface of the workpiece, such that no standoff gap is formed. For example, a gasket or seal may be coupled to the outer rim, and sealingly engage the surface of the workpiece.

Certain embodiments of the present disclosure provide a manufacturing byproduct collection method that includes mounting a collection shroud on or within a predetermined operating location of workpiece. The mounting includes using a securing mount to temporarily fix the collection shroud to the predetermined operating location.

Notably, the byproduct collection systems and methods are not specifically tied or otherwise adapted to any particular tool. Instead, the byproduct collection systems and methods may be used in conjunction with all or most tools that are used to operate on a workpiece.

Embodiments of the present disclosure provide byproduct collection systems that leads to reduced cleaning of a workpiece after one or more manufacturing processes. Further, the byproduct collection systems and methods lead to cleaner and safer work environments, due to a reduction in foreign object debris. Also, the byproduct collection systems and methods reduce the chances of individuals inhaling fumes and dust from exotic materials and metals, for example.

In various embodiments, the collection shroud may include at least one air passage port formed through a portion thereof. For example, the air passage port(s) may include one or more openings formed through a base, wall, or other portion of a main body. The opening(s) may be covered by a cover, which may be secured to the collection shroud and configured to be moved between closed and open positions. In at least one embodiment, the cover may be configured to be removed from the collection shroud to expose the opening(s).

The air passage port(s) is configured to eliminate, minimize, or otherwise reduce vacuum pressure within a byproduct collection chamber of the collection shroud. Excessive vacuum pressure within the byproduct collection chamber may compromise a structure to which the collection shroud is mounted, and/or the collection shroud itself. The air passage port(s) allow air to flow into the byproduct collection chamber to relieve vacuum pressure therein. Further, the air passage port(s) facilitate air flow through the byproduct collection chamber, which improves the rate and efficiency of byproduct collection.

Certain embodiments of the present disclosure provide a byproduct collection system that is configured to collect byproducts of a manufacturing operation on a workpiece. The byproduct collection system includes a collection shroud defining a byproduct collection chamber, and a securing mount coupled to the collection shroud. The securing mount is configured to removably secure the byproduct collection system to a first surface of the workpiece so that the collection shroud is proximate to a working location of the workpiece during a working operation on the workpiece. The collection shroud includes a main body having one or more air passage ports (such as holes, channels, apertures, or other such openings). The air passage port(s) may be selectively covered and uncovered (partially or fully) to adjust vacuum pressure within a byproduct collection chamber of the collection shroud.

In at least one embodiment, the collection shroud may include a first portion that is moveably coupled to a second portion. For example, the first portion may be pivotally coupled to the second portion. A securing member (such as a latch, clasp, lock, or the like) is configured to securely close the first and second portions together in a closed position. The first and second portions are moveably coupled together to quickly and easily fit around portions of tools, such as hole saws, sanders, drills, and/or the like. A collection shroud having moveable portions may be used with collection shrouds with or without air passage ports.

The first and second portions are configured to open in relation to one another in order to accommodate various tools that generally are not used with shrouds, such as hole saws. In the open position, a tool operator is able to easily see inside the collection shroud in order to align various tools and components therein.

Certain embodiments of the present disclosure provide a byproduct collection system that is configured to collect byproducts of a manufacturing operation on a workpiece. The byproduct collection system includes a collection shroud defining a byproduct collection chamber, and a securing mount coupled to the collection shroud. The securing mount is configured to removably secure the byproduct collection system to a first surface of the workpiece so that the collection shroud is proximate to a working location of the workpiece during a working operation on the workpiece. The collection shroud has a first portion and a second portion that are moveably coupled (for example, pivotally, hingeably, or the like) to one another. In at least one embodiment, the first and second portions pivot relative to one another along an axis that is perpendicular to the first surface of the workpiece.

FIG. 1 is a diagrammatic representation of a front perspective view of a byproduct collection system 100, according to an embodiment of the present disclosure. The byproduct collection system 100 includes a collection shroud 102 coupled to a securing mount 104.

The collection shroud 102 includes a main body 106 including a base 108 integrally connected to a perimeter wall 110 having an exposed outer rim 112. Internal surfaces of the base 108 and the perimeter wall 110 define a byproduct collection chamber 114 therebetween. The front side of the main body 106 is open, thereby exposing the collection chamber 114. A vacuum channel 116 is formed through a portion of the perimeter wall 110. The vacuum channel 116 extends through the perimeter wall 110 and into and through a vacuum port 118 (such as a tube) that outwardly extends from an outer surface 119 of the perimeter wall 110 opposite from the byproduct collection chamber 114. Optionally, the vacuum channel 116 may be formed through various other portions of the collection shroud 102. For example, the vacuum channel 116 may be formed through a portion of the base 108. Similarly, the vacuum port 118 may extend from various other portions of the collection shroud 102, depending on the location of the vacuum channel 116 formed through the portion of the main body 106.

The collection shroud 102 may have a circular axial cross section. In at least one embodiment, the collection shroud 102 may be formed as a hemisphere. In such an embodiment, the base 108 may not include a flat surface. In at least one other embodiment, the base 108 includes a flat planar surface. The collection shroud 102 may be formed in various other shapes and sizes other than shown. For example, the collection shroud 102 may include a triangular, rectangular, pentagonal, hexagonal, heptagonal, octagonal, or the like cross section. In at least one other embodiment, the collection shroud 102 may include a cross section that is crescent shape, a trapezoidal shape, a parallelogram shape, or various other shapes. In at least one other embodiment, the collection shroud 102 may have a cross section which is an irregular shape.

The collection shroud 102 may couple to the securing mount 104 through a coupler 120 that outwardly extends from the outer wall 119 of the base 108 and/or the perimeter wall 110. The coupler 120 may be or include a beam, strap, strut, flange, arch, or other such protuberance outwardly extending from the collection shroud 102.

The collection shroud 102, the vacuum port 118, and the coupler 120 may be integrally molded and formed as a monolithic, single piece of material. For example, the collection shroud 102, the vacuum port 118, and the coupler 120 may be integrally molded and formed as a single piece of injection-molded plastic. In at least one other embodiment, the collection shroud 102, the vacuum port 118, and the coupler 120 may be an integrally formed piece of metal. Forming the collection shroud 102, the vacuum port 118, and the coupler 120 as a single, integral piece provides a robust and strong construction. Alternatively, the collection shroud 102, the vacuum port 118, and the coupler 120 may be separate and distinct pieces that are assembled together, such as through bonding, fasteners, and/or the like.

The securing mount 104 is secured to the collection shroud 102 via the coupler 120. For example, the securing mount 104 is securely connected to an end 122 of the coupler 120 that is distally located from the collection shroud 102. The securing mount 104 may secure to the coupler through one or more fasteners, adhesives, reciprocal features (such as a slot formed in the securing mount 104 mating with a reciprocal tab formed on the coupler 120), and/or the like.

As shown, the securing mount 104 includes a suction cup 124 having a suction chamber 126 defined by a lip 128 and a base 130. A suction generator 132, such as a hand pump or plunger, is operatively connected to the suction cup 124. The suction generator 132 is configured to be engaged by an individual (such as by depressing a hand pump) to generate a suction force within the suction chamber 126 that causes the lip 128 to removably secure (for example, temporarily fix) to a surface of a structure. To release the suction cup 124 from the surface, the individual engages the suction generator 132 in an opposite manner (such as by outwardly pulling or otherwise releasing the hand pump or a suction release valve coupled thereto) to release the suction force, so that the securing mount 104 may be removed from the surface. As another example, an individual may pull on a release mechanism, such as a tab, lever, handle, or the like, that releases the suction force.

Figure 2:
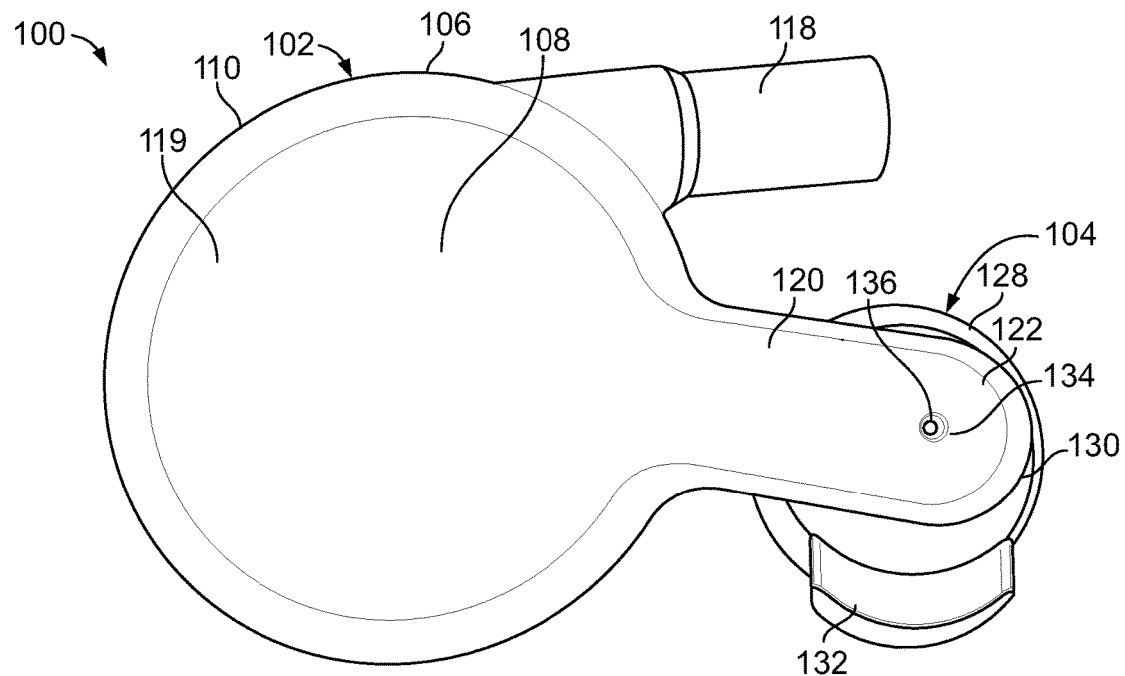
FIG. 2 is a diagrammatic representation of a rear perspective view of a byproduct collection system, according to an embodiment of the present disclosure.
Figure 3:
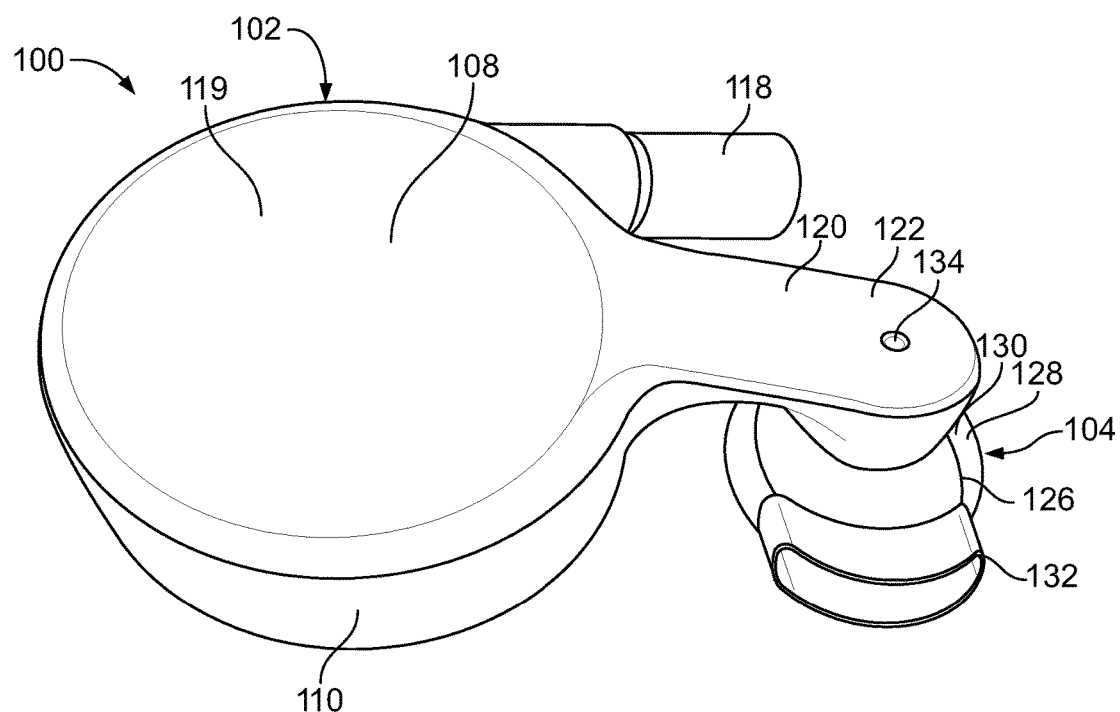
FIG. 3 is a diagrammatic representation of a lateral perspective view of a byproduct collection system, according to an embodiment of the present disclosure.

FIGS. 2 and 3 are diagrammatic representations of rear and lateral perspective views, respectively, of the byproduct collection system 100. Referring to FIGS. 2 and 3, the collection shroud 102 may be formed of a fluid impermeable plastic or metal. As such, fluids (gasses and liquids) collected within the collection chamber 114 (shown in FIG. 1) are unable to pass through the base 108 and the perimeter wall 110.

As shown, a retainer 134 (such as a passage, hole, channel, or the like) may be formed through the coupler 120 at or proximate to the end 122. At least a portion of the retainer 134 retains a protuberance 136 extending from a rear side of the securing mount 104. In this manner, the securing mount 104 may securely mount to the coupler 120. Optionally, the securing mount 104 may include a retainer, and the coupler 120 may include a protuberance that is retained by the retainer. In other embodiments, the coupler 120 and the securing mount 104 may be connected through screws, pins, adhesives, and/or the like.

Referring to FIGS. 1-3, the collection shroud 102 may include one or more air passage ports formed through a portion thereof. For example, the air passage ports may be formed through the base 108, perimeter wall 110, or the like. The air passage port(s) is configured to allow air to flow into the byproduct collection chamber 114, thereby relieving vacuum pressure therein. Further, a vacuum coupled to the vacuum port 118 draws air outside of the collection shroud 102 into the byproduct collection chamber 114 and into the vacuum channel 116. Outside air drawn into the byproduct collection chamber 114 in such a manner flows over a surface of a workpiece to which the collection shroud 102 is mounted, thereby improving removal of byproducts therefrom.

In at least one embodiment, the main body 106 of the collection shroud 102 includes a first portion moveably coupled to a second portion. For example, the first portion may be pivotally or hingeably coupled to the second portion. The first and second portions may be configured to be moved between open and closed positions. In the open position, the collection shroud 102 may be fit around a portion of a tool or other component proximate to a workpiece. When the first portion is opened with respect to the second portion, an operator is able to see into the byproduct collection chamber and quickly and easily align the collection shroud 102 with respect to a tool, for example. After the collection shroud 102 is aligned with respect to the tool, the first and second portions are closed and secured relative to one another, to securely fit around the tool.

Figure 4:
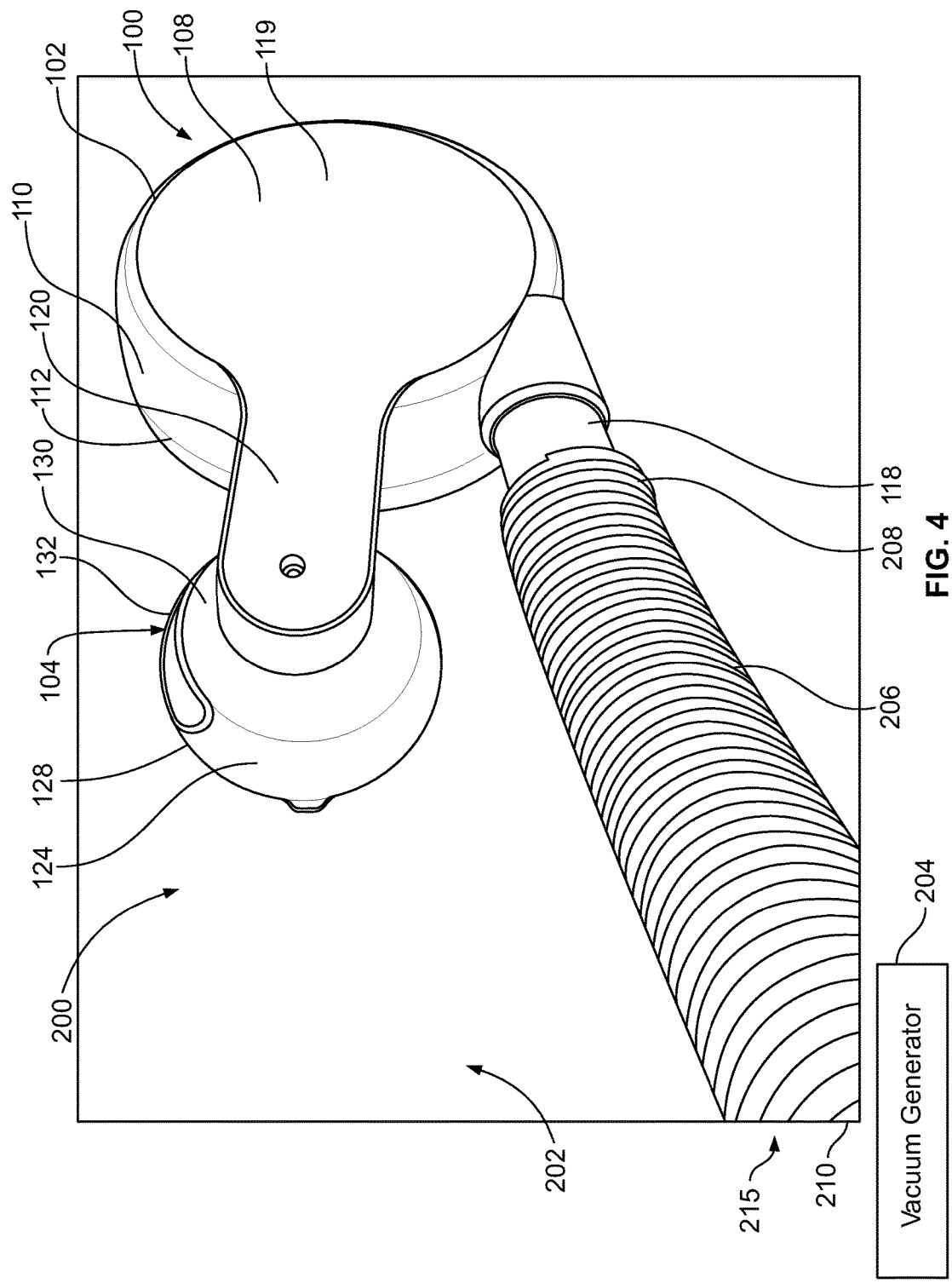
FIG. 4 is a diagrammatic representation of a rear perspective view of a byproduct collection system removably secured to a workpiece, according to an embodiment of the present disclosure.

FIG. 4 is a diagrammatic representation of a rear perspective view of the byproduct collection system 100 removably secured to a workpiece 200, according to an embodiment of the present disclosure. The workpiece 200 may be a panel, frame, block, and/or the like. The byproduct collection system 100 is removably secured to the workpiece 200 in that the byproduct collection system 100 is temporarily fixed to the workpiece 200, such as through operation of the securing mount 104. As shown, the suction generator 132 is depressed such that a suction force is generated in the suction chamber 126 (shown in FIG. 1), thereby securing the suction cup 124 to the workpiece 200.

As shown, the byproduct collection system 100 is removably secured to a first surface, such as backing surface 202, of the workpiece 200. The backing surface 202 is opposite from a second surface, such as operating surface (hidden from view in FIG. 4), of the workpiece 200. The operating surface is the surface facing an individual who engages the workpiece 200 with a tool, such as a drill. The individual operating the tool is located on a side of the workpiece that is opposite from the backing surface 202. The operating surface is configured to initially receive an operative portion of a tool. For example, an operative portion of a drill initially contacts the operating surface and drills through the workpiece from the operating surface towards the backing surface 202.

It is to be understood that the terms first and second surfaces merely indicate two different surfaces of a structure. The backing surface 202 may be the first or second surface of the workpiece 200, while the operating surface may be the other of the first or second surface of the workpiece 200.

A vacuum generator 204 (shown in block form) is operatively coupled to the collection shroud 102 through a connection conduit 206 (only a portion of which is shown). One end 208 of the connection conduit 206 fits around the vacuum port 118, while an opposite end 210 of the connection conduit 206 connects to a portion of the vacuum generator 204. The vacuum generator 204 couples to the byproduct collection system 100 to provide a system 215 for collecting and removing manufacturing byproducts from and around the workpiece 200.

The coupler 120 may couple the securing mount 104 to the collection shroud 102 so that the outer rim 112 of the collection shroud 102 is separated from the backing surface 202 a standoff distance, which provides a small gap between the collection shroud 102 and the backing surface 202. The small gap may be between 0.1 inch and 1 inch, for example. Optionally, the small gap may be less than 0.1 inch or more than 1 inch.

Alternatively, the outer rim 112 may directly contact the backing surface 202. For example, the outer rim 112 may abut against the backing surface 202 such that any gap therebetween is eliminated or otherwise reduced. In at least one embodiment, the outer rim 112 may sealingly engage the backing surface 202, such as through a gasket or seal.

In operation, a working location is first determined. The working location is a location on the operating surface of the workpiece 200 at which a tool or equipment is to engage the workpiece 200. After the working location is determined, the byproduct collection system 100 is secured to the backing surface 202 at an area that may be axially aligned with the working location. For example, the collection shroud 102 may be positioned on or above (if a small gap exists therebetween) the backing surface 202 about and around an outer perimeter envelope of the working location.

After the collection shroud 102 is positioned relative to the working location, the securing mount 104 is engaged to temporarily fix the byproduct collection system 100 to the workpiece 200. For example, the suction generator 132 is shown in an engaged position in FIG. 4, which provides a suction force that securely couples the suction cup 124 to the backing surface 202. The suction force exerted by the suction cup 124 relative to the backing surface 202 temporarily fixes the byproduct collection system 100 to the backing surface 202.

After the byproduct collection system 100 is secured to the backing surface 202, the vacuum generator 204 may be activated to generate a vacuum force. The vacuum force generated by the vacuum generator 204 draws byproducts (such as fumes, dust, debris, and the like) into the byproduct collection chamber 114 (shown in FIG. 1), and into the connection conduit 206 through the vacuum channel 116 (shown in FIG. 1) formed through the perimeter wall 110 and the vacuum port 118. Further, the vacuum force generated by the vacuum generator 204 draws byproducts surrounding the collection shroud 102 through the standoff gap between the outer rim 112 and the backing surface 202. As such, when an individual engages the workpiece 200 with a tool or equipment on the operating side of the workpiece, byproducts of such a manufacturing operation are collected in the collection shroud 102 and drawn to the vacuum generator 204 via vacuum force. In this manner, at least some byproducts of the manufacturing operation do not eject, disperse, deposit, pass, or the like into an environment proximate to the backing surface 202. Further, at least some byproducts of the manufacturing process on or proximate to the operating surface of the workpiece are drawn through a hole formed during the manufacturing process into the collection chamber 114, such as through the vacuum force generated by the vacuum generator 204. Such byproducts are also drawn into the vacuum generator 204.

The collection shroud 102 also provides a barrier that protects individuals from tools or equipment that may pass through the workpiece 200. For example, an operative tip of a drill may pass through the workpiece 200 from the operating surface to and through the backing surface 202. The collection shroud 102 impedes the tip of the drill from passing through the collection shroud 102, thereby providing a safety barrier that prevents the tip of the drill from contacting an individual who may be proximate to the backing surface 202.

When the manufacturing process is complete, the securing mount 104 may be disengaged so that the suction cup 124 may be removed from the backing surface 202. For example, the suction generator 132 may be disengaged to allow the suction force of the suction cup 124 to be released. The byproduct collection system 100 may then be removed from the backing surface 202 and positioned on another portion of the backing surface 202 proximate to a subsequent working location.

FIG. 5 is a diagrammatic representation of a front view of a portion of the workpiece 200, according to an embodiment of the present disclosure. A working location 220 is determined on an operating surface 222 of the workpiece 200. As noted, the operating surface 222 is the surface facing an individual who engages the workpiece 200 with a tool, such as a drill. The operating surface 222 is opposite from the backing surface 202 (shown in FIG. 4).

A hole 224 may be formed through the workpiece 200 from and through the operating surface 222 to and through the backing surface 202 (shown in FIG. 4). A working area 226 may surround the hole 224. A tool may be used to engage the working area 226 to form features on, within, and/or through the working area 226. For example, a drill may be used to form holes through the working area 226.

The collection shroud 102 is positioned on the backing surface 202 (shown in FIG. 1) opposite from the operating surface 222. As shown in FIG. 5, the collection chamber 114 is exposed through the hole 224. The collection shroud 102 may be axially aligned with the working area 226. The outer rim 112 (shown in FIG. 1) of the collection shroud 102 may have a greater diameter than that of the working area 226, and therefore extends beyond an axial envelope 240 of the working area 226. Thus, the working area 226 is aligned with and/or within a perimeter envelope of the collection shroud 102. The perimeter envelope of the collection shroud 102 is a virtual shape having an axial cross section that is axially aligned with the perimeter of the outer rim 112 (shown in FIG. 1) of the collection shroud 102, and which extends from the outer rim 112 through the workpiece 200. As such, byproducts generated during a manufacturing operation on the working area 226 are collected within the collection shroud 102.

FIG. 6 is a diagrammatic representation of a lateral front perspective view of the byproduct collection system 100, according to an embodiment of the present disclosure. The securing mount 104 (shown in FIGS. 1-4) is not shown in FIG. 6. As shown, the coupler 120 may include an attaching member 300 at the end 122. The attaching member 300 is configured to securely attach the securing mount 104 to the coupler 120. The attaching member 300 may include a post 302 having a recessed area 304 formed in an exposed end 306. The recessed area 304 is configured to retain a reciprocal structure formed on the securing mount 104 to securely attach the securing mount 104 to the attaching member 300. The length of the post 308 may be such to ensure that the outer rim 112 of the collection shroud 102 is offset from a surface of a workpiece. For example, the post 308 may be sized to ensure that the securing mount 104 extends a farther distance towards the workpiece than the collection shroud 102, thereby providing a standoff gap between the outer rim 112 and the workpiece when the byproduct collection system 100 is secured to the workpiece.

FIG. 7A is a diagrammatic representation of a rear perspective view of a byproduct collection system 100, according to an embodiment of the present disclosure. A securing mount is not shown in FIG. 7. The coupler 120 may include a mounting port 400 formed through the end 122. The mounting port 400 is configured to receive at least a portion and/or a reciprocal feature of a suction assembly.

An exhaust port 402 may be formed through the coupler 120. The exhaust port 402 is configured to provide a vent through the coupler 120 that connects to the suction assembly. The exhaust port 402 is configured to exhaust air. In at least one embodiment, the exhaust port 402 vents compressed air from a vacuum generator. The vacuum generator may be powered by compressed air, and generates a vacuum force that causes a suction cup to securely fix to a surface.

FIG. 7B is a diagrammatic representation of a rear perspective view of the byproduct collection system 100 having an automatic suction generator 500, according to an embodiment of the present disclosure. As shown, the suction generator 500 is positioned within the mounting port 400.

FIG. 8 is a diagrammatic representation of a rear perspective view of the automatic suction generator 500, according to an embodiment of the present disclosure. The suction generator 500 is configured to receive and retain a portion of a suction cup (not shown in FIG. 8) within a suction channel 502. An end 504 of the suction generator 500 is configured to securely couple to the coupler 120 (shown in FIG. 7) such that a portion of the end 504 extends into the mounting port 400. The suction assembly described with respect to FIGS. 7 and 8 is one example of a securing mount, such as the securing mount 104 (shown in FIGS. 1-4). Various other types of securing mounts may be used to removably secure the byproduct collection system 100 (shown in FIGS. 1-7) to a structure. For example, the securing mount may include multiple suction cups. In at least one embodiment, a separate and distinct suction generator may not be used.

Figure 9:
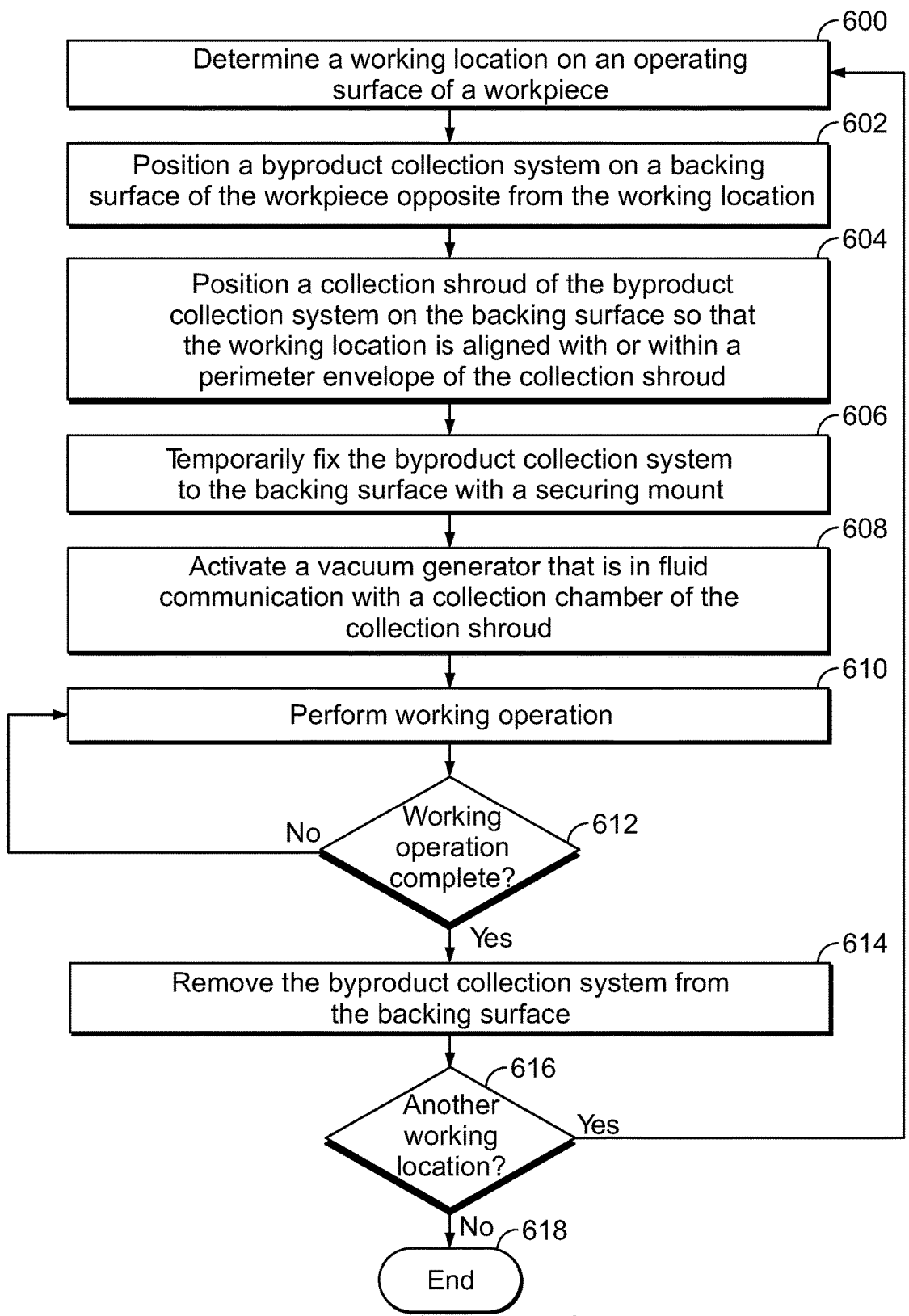
FIG. 9 illustrates a flow chart of a method of collecting byproducts from a workpiece, according to an embodiment of the present disclosure.

FIG. 9 illustrates a flow chart of a method of collecting byproducts from a workpiece, according to an embodiment of the present disclosure. The method begins at 600, at which a working location on an operating surface of a workpiece is determined. At 602, a byproduct collection system is positioned on a backing surface of the working piece opposite from the working location.

At 604, a collection shroud of the byproduct collection system is positioned on the backing surface so that the working location is aligned with or within a perimeter envelope of the collection shroud. At 606, the byproduct collection system is temporarily fixed to the backing surface with a securing mount. At 608, a vacuum generator that is in fluid communication with a collection chamber of the collection shroud is activated.

At 610, a working operation is performed on the working location. The working operation may be drilling, milling, grinding, crimping, soldering and/or the like with one or more tools, for example. During the working operation, the vacuum generator draws byproducts into the collection chamber and to the vacuum generator. At 612, it is determined if the working operation is complete. If the working operation is not complete, the method returns to 610.

If, however, the working operation is complete at 612, the method proceeds to 614, at which the byproduct collection system is removed from the backing surface. At 616 it is determined if there is another working location. If there is another working location, the method returns to 600. If, however, there is not another working location, the method ends at 618.

Figure 10:
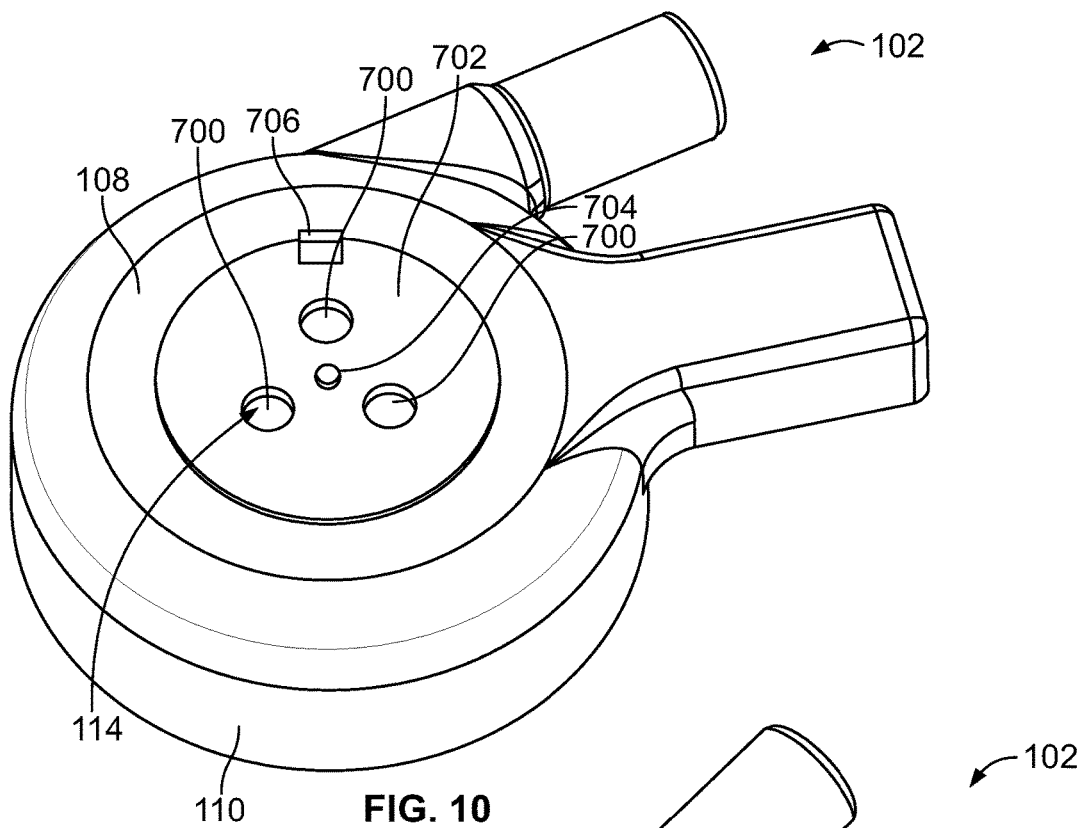
FIG. 10 is a diagrammatic representation of a rear perspective view of a collection shroud, according to an embodiment of the present disclosure.

FIG. 10 is a diagrammatic representation of a rear perspective view of the collection shroud 102, according to an embodiment of the present disclosure. The collection shroud 102 is similar to those described above, except that the collection shroud 102 includes a plurality of air passage ports 700 formed through the base 108. As shown, the collection shroud 102 includes three air passage ports 700. Optionally, the collection shroud 102 may include more or less air passage ports 700 than shown. Also, the air passage ports 700 may be formed through various other portions of the main body 106, such as the perimeter wall 110.

A cover 702 is moveably secured to the base 108. For example, the cover 702 is rotatably coupled to the base 108 at a rotation axle 704. The cover 702 may be a circular disc that overlays the base 108. An engagement member 706 (such as a tab, stud, handle, or other such protuberance) outwardly extends from the cover 702. The engagement member 706 is configured to be engaged by an operator to rotate the cover 702 about the rotation axle 704 between an open position, in which the air passage ports 700 are open and exposed, and a closed position, in which the air passage ports 700 are closed. The cover 702 may be moved between fully open and fully closed positions, and all points therebetween (such as partially open and partially closed positions).

Referring to FIGS. 4 and 10, the vacuum generator 204 is operatively coupled to the collection shroud 102 through a connection conduit 206 (only a portion of which is shown). The vacuum generator 204 couples to the byproduct collection system 100 to provide a system 215 for collecting and removing manufacturing byproducts from and around the workpiece 200. In the open position, the air passage ports 700 allow outside air to pass into the byproduct collection chamber 114 of the collection shroud 102. As air passes into the byproduct collection chamber 114, vacuum pressure therein is eliminated, minimized, or otherwise reduced. If increased vacuum pressure is desired, the cover 702 may be moved to a closed position, in which the air passage ports 700 are closed. The cover 702 may be moved to a partially open position to provide and/or adjust a desired amount of vacuum pressure within the byproduct collection chamber 114.

Air from outside the collection shroud 102 is drawn into the byproduct collection chamber 114 through the open air passage ports 700. The outside air that is drawn in through the open air passage ports 700 flows over surfaces of the workpiece 200 on which the collection shroud 102 is mounted, thereby whisking away byproducts on the surfaces of the workpiece 200.

Figure 11:
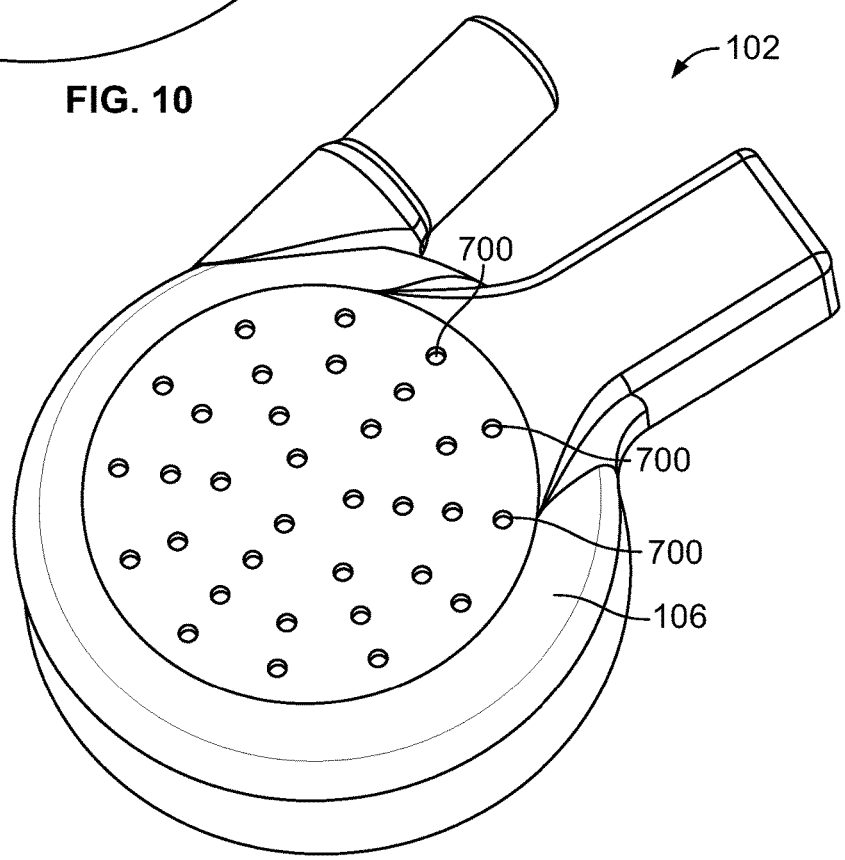
FIG. 11 is a diagrammatic representation of a rear perspective view of a collection shroud, according to an embodiment of the present disclosure.

FIG. 11 is a diagrammatic representation of a rear perspective view of the collection shroud 102, according to an embodiment of the present disclosure. The collection shroud 102 is similar to that of FIG. 10, except the collection shroud 102 includes more air passage ports 700. The air passage ports 700 may be smaller than those shown in FIG. 10. Further, the collection shroud 102 shown in FIG. 11 may not include a moveable cover. Optionally, the collection shroud 102 shown in FIG. 11 may include a cover.

A regular pattern of the air passage ports 700 may be formed through the main body 106. Optionally, the air passage ports 700 may not be formed irregularly on the main body 106. The collection shroud 102 may include more or less air passage ports 700 than shown.

As shown, the air passage ports 700 may have a circular axial cross-section. Optionally, the air passage ports 700 may be sized and shaped differently than shown. For example, the air passage ports 700 may be rectangular, triangular, irregularly-shaped, semi-circular, and/or the like.

Figure 12:
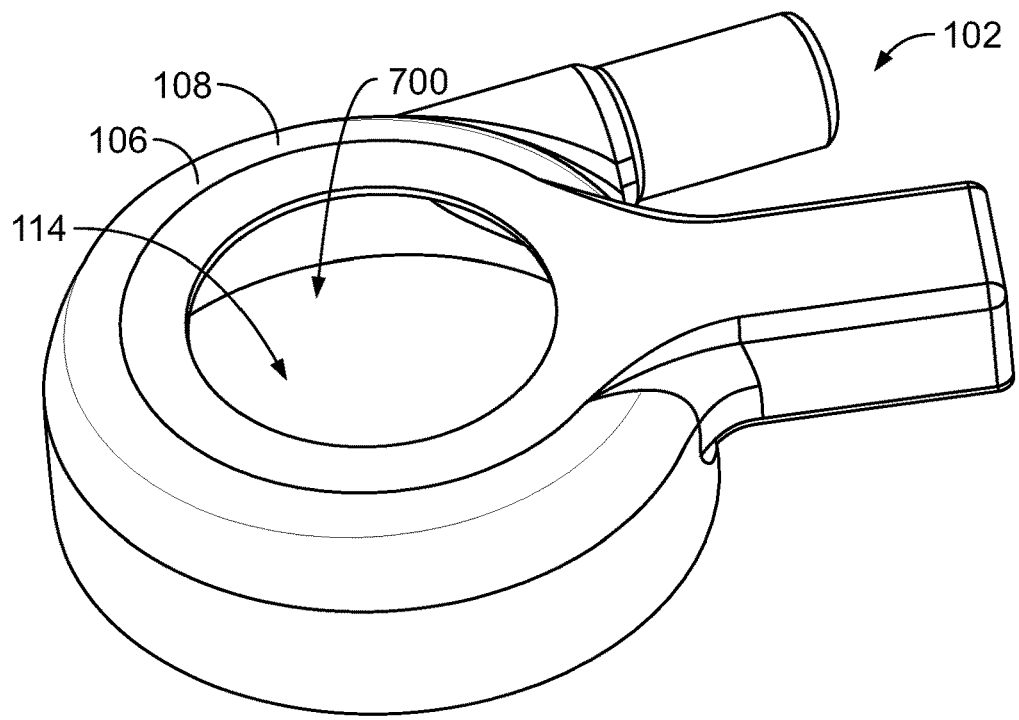
FIG. 12 is a diagrammatic representation of a rear perspective view of a collection shroud, according to an embodiment of the present disclosure.

FIG. 12 is a diagrammatic representation of a rear perspective view of the collection shroud 102, according to an embodiment of the present disclosure. In this embodiment, the collection shroud 102 includes a single, relatively large air passage port 700. The air passage port 700 may be formed through a substantial portion of the base 108. The air passage port 700 may be sized and shaped to allow passage of a tool to be positioned therethrough. As such, the air passage port 700 is able to accommodate use of a tool through the collection shroud 102 to work on a rear surface of a workpiece.

While not shown, a cover may be secured to the collection shroud 102 over the air passage port 700. In at least one other embodiment, one or more cross beams may span across the air passage port 700. In at least one other embodiment, a screen (such as a mesh screen) may be secured to the collection shroud 102 over the air passage port 700.

Figure 13:
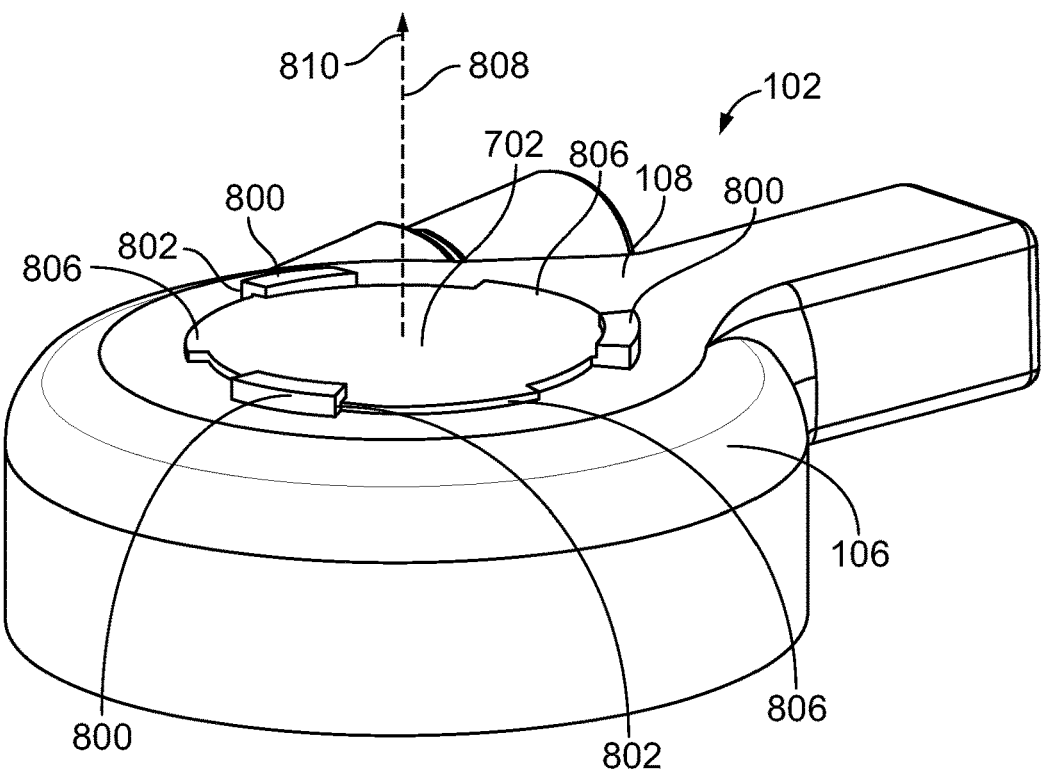
FIG. 13 is a diagrammatic representation of a lateral rear perspective view of a collection shroud, according to an embodiment of the present disclosure.

FIG. 13 is a diagrammatic representation of a lateral rear perspective view of the collection shroud 102, according to an embodiment of the present disclosure. In this embodiment, a cover 702 is removably coupled to the base 108 of the collection shroud over an air passage port (such as the air passage port 700 shown in FIG. 12). Ledges 800 outwardly extend from the base 108 around the air passage port. The ledges 800 define radial notches 802 that are configured to retain radial flanges 806 of the cover 702. In the closed position, the flanges 806 are retained by the ledges 800 within at least portion of the notches 802. In order to expose the air passage port(s), the cover 702 is axially rotated about a central axis 808 so that the flanges 806 are removed from the notches 802. As such, the ledges 800 no longer retain the flanges 806, and the cover 702 may be removed from the base 108 in the direction of arrow 810 to expose the air passage port(s). The cover 702 may include one or more engagement members (such as tabs, posts, handles, or other such protuberances) that facilitate rotation, removal, and repositioning of the cover 702 with respect to the base 108.

Figure 14:
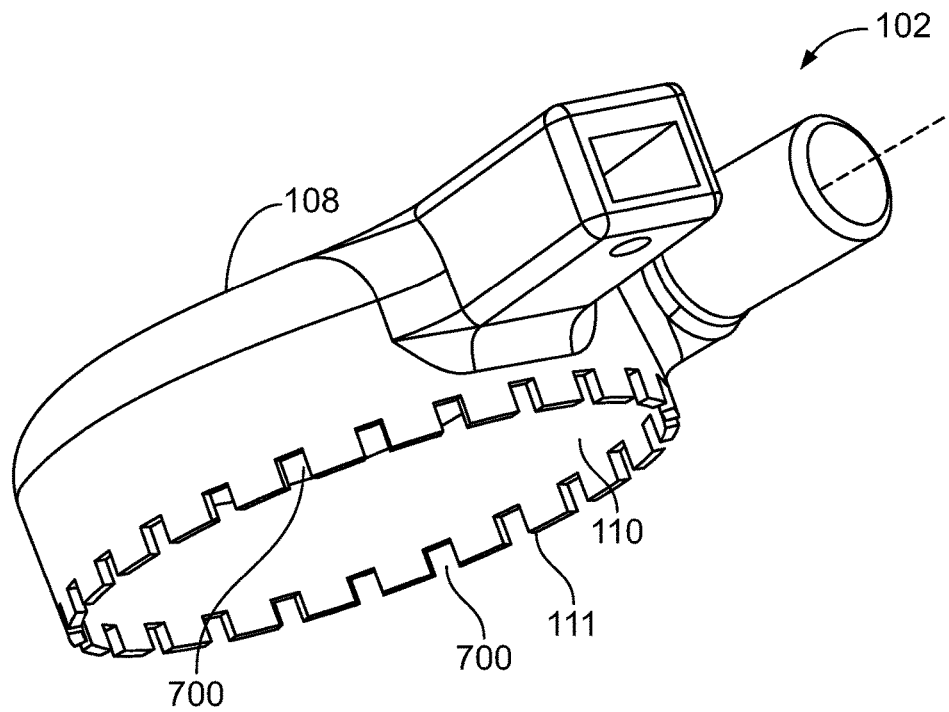
FIG. 14 is a diagrammatic representation of a lateral rear perspective view of a collection shroud, according to an embodiment of the present disclosure.

FIG. 14 is a diagrammatic representation of a lateral rear perspective view of the collection shroud 102, according to an embodiment of the present disclosure. In this embodiment, a plurality of air passage ports 700 are formed through the outer perimeter wall 110 of the collection shroud 102. Each air passage port 700 may extend to and through an exposed edge 111 of the perimeter wall 110.

Referring to FIGS. 4 and 14, the edge 111 abuts against the workpiece 200. As such, the air passage ports 700 couple directly to the surface of the workpiece 200, thereby allowing outside air to be drawn therethrough, and flow directly over the surface of the workpiece 200. It has been found that the air passage ports 700 directly connecting to the surface of the workpiece 200 facilitate efficient removal of byproducts from the surface of the workpiece 200.

Alternatively, the air passage ports 700 may be formed through the perimeter wall 110 such that they do not directly connect to the surface of the workpiece 200. For example, the air passage ports 700 may be formed as rectangular openings of the workpiece away from the surface of the workpiece 200.

As shown, each air passage port 700 may be formed as a rectangular opening formed through the edge 111 of the perimeter wall 110. Optionally, the air passage ports 700 may be differently shaped, such as semi-circles, triangles, irregular shapes, or the like. Further, the air passage ports 700 may be regularly spaced about the perimeter wall 110. In at least one other embodiment, the air passage ports 700 may be irregularly spaced about the perimeter wall 110. The air passage ports 700 may be larger or smaller than shown. Further, the collection shroud 102 may include more or less air passage ports 700 than shown.

Referring to FIGS. 10-14, the collection shroud 102 may be used with a suction cup 124 (such as shown in FIG. 1). Alternatively, the collection shroud 102 may not be used with a suction cup 124.

Figure 15:
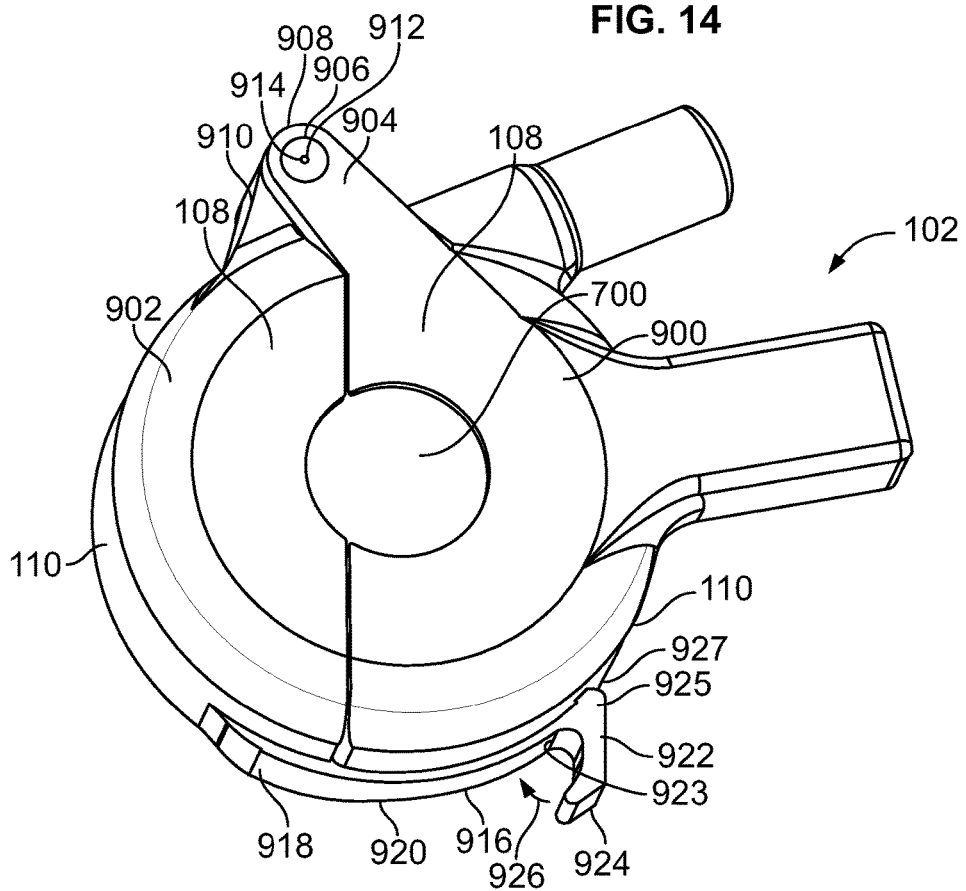
FIG. 15 is a diagrammatic representation of a rear perspective view of a collection shroud, according to an embodiment of the present disclosure.
Figure 16:
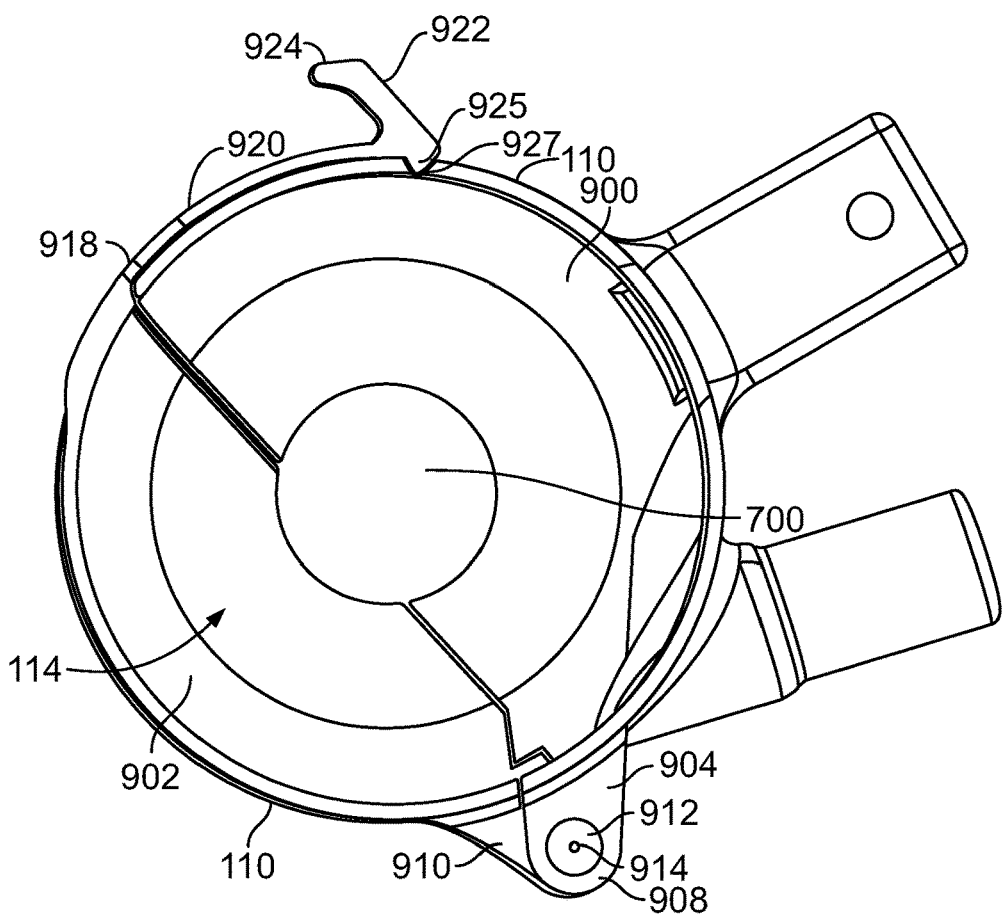
FIG. 16 is a diagrammatic representation of a front perspective view of a collection shroud, according to an embodiment of the present disclosure.
Figure 17:
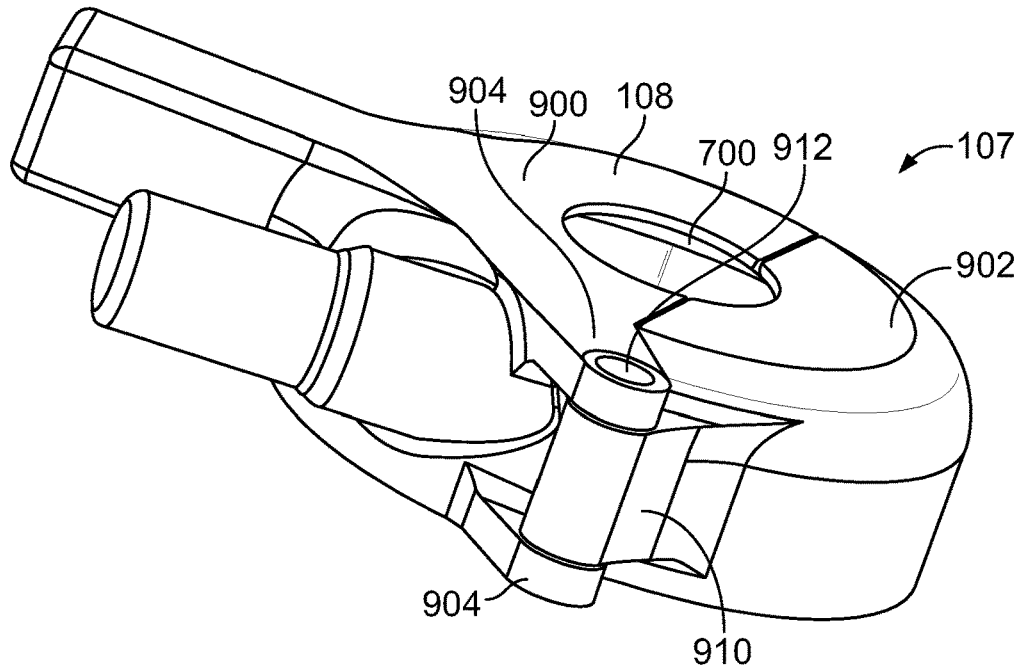
FIG. 17 is a diagrammatic representation of a first lateral perspective view of a collection shroud, according to an embodiment of the present disclosure.
Figure 18:
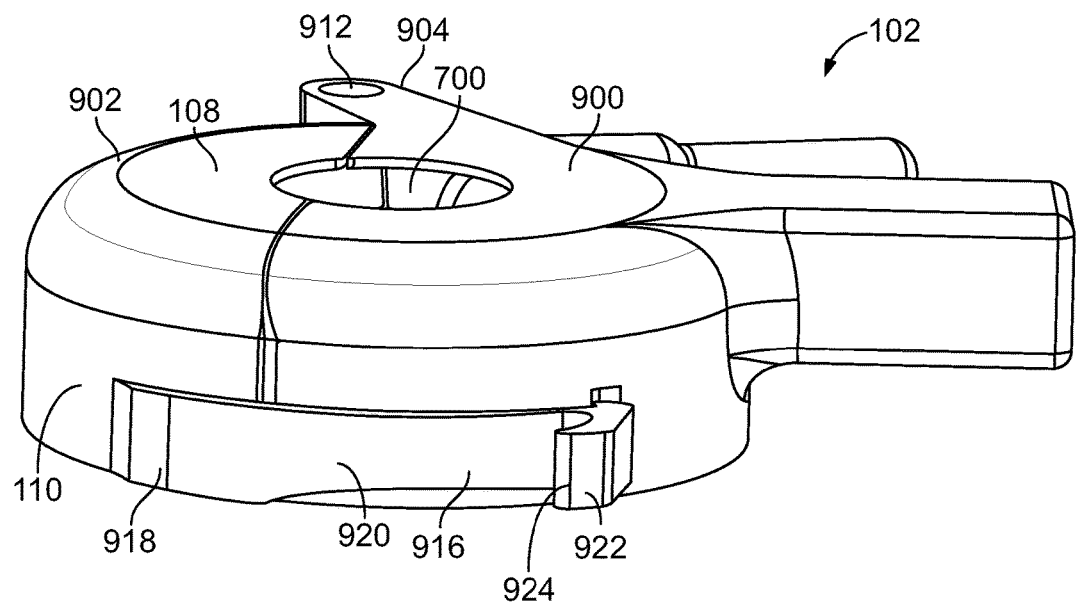
FIG. 18 is a diagrammatic representation of a second lateral perspective view of a collection shroud, according to an embodiment of the present disclosure.

FIG. 15 is a diagrammatic representation of a lateral rear perspective view of the collection shroud 102, according to an embodiment of the present disclosure. FIG. 16 is a diagrammatic representation of a lateral front perspective view of the collection shroud 102. FIG. 17 is a diagrammatic representation of a first lateral perspective view of the collection shroud 102. FIG. 18 is a diagrammatic representation of a second lateral perspective view (opposite from the first lateral perspective view) of the collection shroud 102.

Referring to FIGS. 15-18, the collection shroud 102 includes a first portion 900 coupled to a second portion 902. The first portion 900 is moveably coupled to the second portion 902 so as to move between closed (as shown in FIGS. 15-18) and open positions (an open position being shown in FIG. 19). An air passage port 700 may be formed through the collection shroud 102. The collection shroud 102 may include any of the air passage ports 700 described above with respect to FIGS. 10-14.

As shown in FIG. 15, the air passage port 700 may be a single air passage port 700 formed through the base 108. At least a portion of a tool (such as an operative portion of a hole saw, drill, or the like) may be configured to fit within the air passage port 700.

The first portion 900 may include axially-aligned and separated spurs 904 that outwardly extend therefrom. The spurs 904 include axially-aligned pivot channels 906 at distal ends 908. The second portion 902 includes an outward axle flange 910 between the aligned spurs 904. A pivot pin 912 upwardly extends from the axle flange 910 and is rotatably secured within the pivot channels 906, thereby forming a hinge. That is, the spurs 904 and the flange 910 cooperate to form a hinge. In this manner, the first portion 900 is configured to pivot into an open position relative to the second portion 902 about a pivot axle 914 of the pivot pin 912. Referring to FIGS. 4 and 15, the pivot axle 914 is perpendicular to a surface of the workpiece 200 onto which the collection shroud 102 mounts. Optionally, the first portion 900 may include the pivot pin, while the second portion 902 includes the pivot channel.

Optionally, the first and second portions 900 and 902 may be configured to move between open and closed positions through various other mechanisms other than hinges. For example, the first and second portions 900 and 902 may be coupled to one another through mateable features, fasteners, or the like that allow the first and second portions to be separated from one another. In at least one other embodiment, the first and second portions 900 and 902 may be moveably coupled to one another through clamps, tracks, rails, and/or the like.

The second portion 902 may also include a securing member 916 that radially extends over the perimeter wall 110. The securing member 916 may be a latch, lock, or other such structure that securely maintains the first and second portions 900 and 902 in a closed position.

The securing member 916 includes a root 918 integrally formed with the second portion 902. The root 918 connects to a radial extension 920 that includes a latch 922 at a distal end 923. The latch 922 includes an inwardly-directed protuberance 925 that is configured to securely engage (for example, be retained within) a reciprocal notch 927 formed in the perimeter wall 110 of the first portion 900 to securely couple the first portion 900 to the second portion 902 in the closed position. The latch 922 includes an outwardly-extending lever 924. In order to release the latch 922 from a securing position, the lever 924 is pulled toward the first portion 900 in the direction of arc 926. In response, the protuberance 925 releases from the notch 927, and the first portion 900 may be pivoted open with respect to the second portion 902, as described above. Optionally, the first portion 900 may include the securing member 916, while the second portion 902 includes the notch 927.

Figure 19:
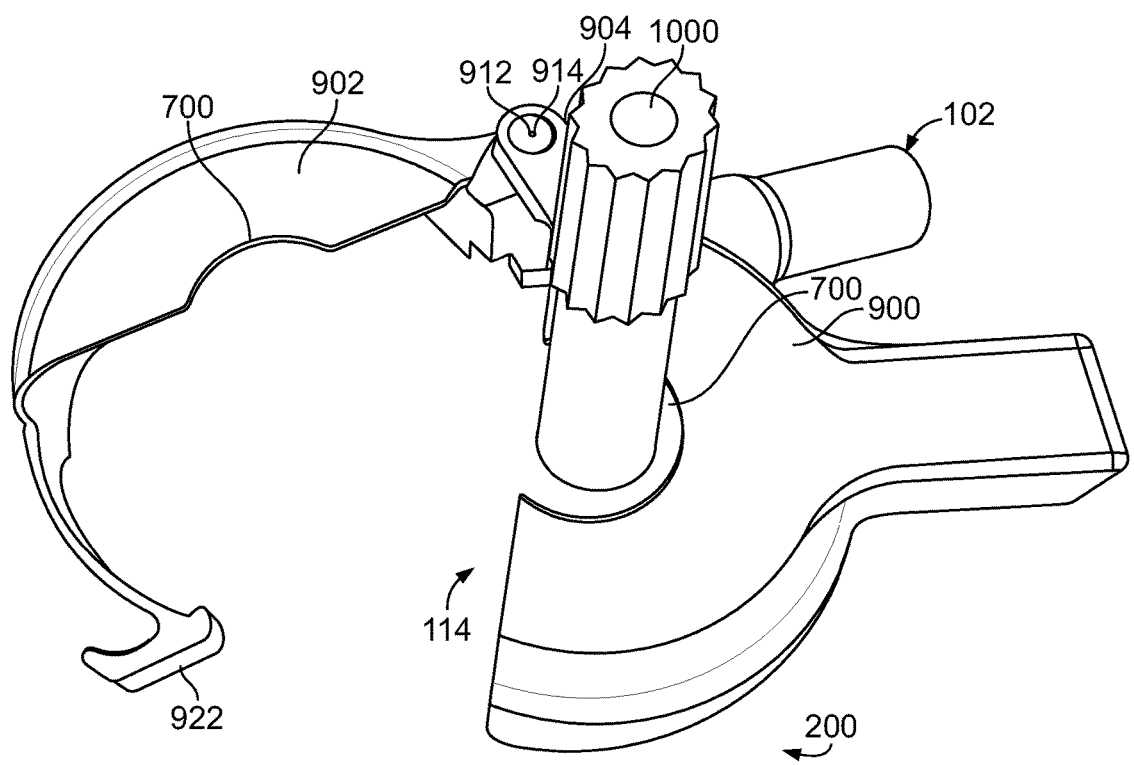
FIG. 19 is a diagrammatic representation of a rear perspective view of a collection shroud mounted on a workpiece, according to an embodiment of the present disclosure.

FIG. 19 is a diagrammatic representation of a rear perspective view of the collection shroud 102 mounted on a workpiece 200, according to an embodiment of the present disclosure. Referring to FIGS. 4 and 19, the collection shroud 102 may be in an open position, such that the second portion 902 is pivoted open with respect to the first portion 900 while on the workpiece 200. The air passage port 700 is separated into two parts in the open position. Because the collection shroud 102 is opened, an operative portion of a tool 1000 (such as a hole saw, drill, or the like) may be positioned in the portion of the air passage port 700 of the first portion 900 (or optionally the second portion 902). As the tool 1000 is positioned and aligned within the open collection shroud 102, an operator may inspect the tool 1000 within the open byproduct collection chamber 114 to ensure that the tool 1000 is properly positioned with respect to the workpiece 200. At this time, the vacuum generator 204 may be operated so that the first portion 900 secures to the workpiece (such as through vacuum pressure). After the tool 1000 is properly aligned with respect to the workpiece 200, the second portion 902 is pivoted into a closed position with respect to the first portion 900, so that the operative portion of the tool 1000 is positioned within the closed air passage port 700. In the closed position, the latch 922 maintains the first and second portions 900 and 902 in a closed position, as described above.

Optionally, the collection shroud 102 shown in FIGS. 15-19 may not include an air passage port. Instead, the collection shroud 102 may be similar to the embodiment shown in FIGS. 1-3, but with a first portion moveably coupled to a second portion.

Further, the collection shroud 102 shown in FIGS. 15-19 may be used with a suction cup 124 (such as shown in FIG. 1). Alternatively, the collection shroud 102 may not be used with a suction cup 124.

Figure 20:
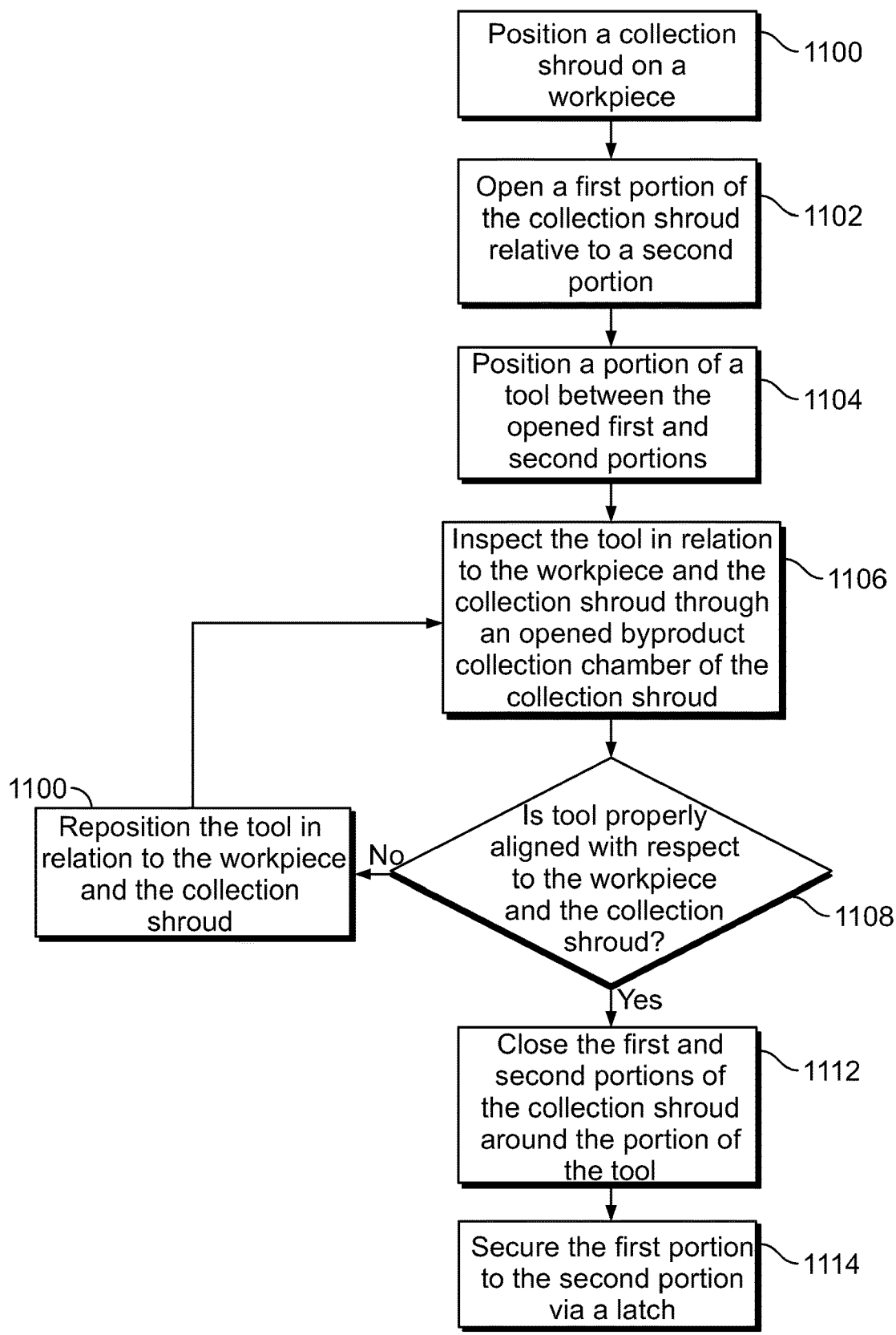
FIG. 20 illustrates a flow chart of a method of aligning a tool with respect to a workpiece and a collection shroud, according to an embodiment of the present disclosure.

FIG. 20 illustrates a flow chart of a method of aligning a tool with respect to a workpiece and a collection shroud, according to an embodiment of the present disclosure. Referring to FIGS. 19 and 20, the method begins at 1100, at which the collection shroud 102 is positioned on the workpiece 200. At 1102, the first portion 900 of the collection shroud 102 is opened relative to the second portion 902 (or vice versa), thereby exposing an opened byproduct collection chamber 114.

At 1104, a portion of the tool 1000 (such as an operative portion of a hole saw, drill, or the like) is positioned between the opened first and second portions 900 and 902 of the collection shroud 102. At 1106, an operator inspects the tool 1000 in relation to the workpiece 200 and the collection shroud 102 through the opened byproduct collection chamber 114 of the collection shroud 102.

At 1108, it is determined whether the tool 1000 is properly aligned and positioned with respect to the workpiece 200 and the collection shroud 102. If not, the method proceeds from 1108 to 1110, at which the tool 1000 is repositioned in relation to the workpiece 200 and the collection shroud 102. The method then returns to 1106.

If, however, the tool 1000 is properly aligned and positioned with respect to the workpiece 200 and the collection shroud 102 at 1108, the method proceeds to 1112, at which the first and second portions 900 and 902 of the collection shroud 102 are closed around the portion of the tool 1000. Then, at 1114, the first portion 900 is secured to the second portion 902 via the latch 922.

As described above, embodiments of the present disclosure provide efficient and cost-effective systems and methods for collecting byproducts during a manufacturing process. That is, the systems and methods do not include specialized shrouds that are specially adapted for and directly connected to tools. Embodiments of the present disclosure provide systems and methods for collecting all or substantially all manufacturing byproducts, whether at or on an operative surface or a backing surface of a workpiece.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical (or various other angles or orientations), and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A byproduct collection system configured to collect byproducts of a manufacturing operation on a workpiece, the byproduct collection system comprising:
   a collection shroud defining a collection chamber;
   a vacuum generator coupled to the collection shroud, wherein the vacuum generator generates a vacuum force within the collection chamber; and
   at least one air passage port formed through the collection shroud, wherein the at least one air passage port is configured to allow air to pass into the collection chamber and reduce vacuum pressure within the collection chamber; and
   a cover positioned over the at least one air passage port, wherein the cover is moveable between a closed position in which the at least one air passage port is covered, and an open position in which the at least one air passage port is exposed and open, wherein the cover moving between the closed position and the open position adjusts the vacuum pressure within the collection chamber.

2. The byproduct collection system of claim 1, wherein the cover is rotationally coupled to the collection shroud, wherein the cover is rotated between the closed position and the open position.

3. The byproduct collection system of claim 1, wherein the cover is secured to the collection shroud in the closed position, and removed from the collection shroud in the open position.

4. The byproduct collection system of claim 1, wherein the at least one air passage port comprises a plurality of air passages.

5. The byproduct collection system of claim 1, wherein the at least one air passage port comprises a single air passage port that is configured to allow a portion of a tool to pass therethrough into the collection chamber.

6. The byproduct collection system of claim 1, wherein the collection shroud comprises a base connected to a perimeter wall.

7. The byproduct collection system of claim 6, wherein the at least one air passage port is formed through a portion of the base.

8. The byproduct collection system of claim 6, wherein the at least one air passage port is formed through a portion of the perimeter wall.

9. The byproduct collection system of claim 1, wherein the at least one air passage port is configured to abut against a surface of the workpiece.

10. The byproduct collection system of claim 1, wherein the collection shroud comprises:
a first portion; and
a second portion moveably coupled to the first portion, wherein the first and second portions are configured to be moved between an open position and a closed position.

11. The byproduct collection system of claim 10, wherein the first portion is moveably coupled to the second portion through a hinge, and wherein the first portion is configured to pivot between the open position and the closed position about a pivot axle that is perpendicular to a surface of the workpiece on which the collection shroud mounts.

12. The byproduct collection system of claim 10, further comprising a latch that is configured to secure the first portion to the second portion in the closed position.

13. The byproduct collection system of claim 10, wherein a portion of a tool is configured to be positioned between the first and second portions in the open position, and wherein the first and second portions are configured to close around the portion of the tool in the closed position.

14. The byproduct collection system of claim 1, further comprising a securing mount coupled to the collection shroud, wherein the securing mount removably secures the byproduct collection system to a first surface of the workpiece so that the collection shroud is proximate to a working location on a second surface of the workpiece that is opposite from the first surface during a working operation on the workpiece, wherein the securing mount removably secures the byproduct collection on the first surface opposite from a tool on the second surface that performs the working operation on the workpiece.

15. The byproduct collection system of claim 14, wherein the securing mount comprises at least one suction cup that is configured to removably connect to the first surface of the workpiece.

16. The byproduct collection system of claim 15, further comprising a suction generator coupled to the at least one suction cup.

17. The byproduct collection system of claim 1, further comprising a vacuum port extending from the collection shroud, wherein a vacuum channel extends through the vacuum port and a portion of the collection shroud, wherein the vacuum channel is in fluid communication with the collection chamber, and wherein the vacuum port is configured to couple to the vacuum generator.

18. A byproduct collection system configured to collect byproducts of a manufacturing operation on a workpiece, the byproduct collection system comprising:
a collection shroud defining a collection chamber, wherein the collection shroud comprises:
a first portion; and
a second portion moveably coupled to the first portion, wherein the first and second portions are configured to be moved between an open position and a closed position; and,
a securing mount coupled to the collection shroud, wherein the securing mount removably secures the byproduct collection system to a first surface of the workpiece so that the collection shroud is proximate to a working location on a second surface of the workpiece that is opposite from the first surface during a working operation on the workpiece, wherein the securing mount removably secures the byproduct collection on the first surface opposite from a tool on the second surface that performs the working operation on the workpiece.

19. The byproduct collection system of claim 18, wherein the first portion is moveably coupled to the second portion through a hinge, and wherein the first portion is configured to pivot between the open position and the closed position about a pivot axle that is perpendicular to a surface of the workpiece on which the collection shroud mounts.

20. The byproduct collection system of claim 18, further comprising a latch that is configured to secure the first portion to the second portion in the closed position.

21. The byproduct collection system of claim 18, wherein a portion of the tool is configured to be positioned between the first and second portions in the open position, and wherein the first and second portions are configured to close around the portion of the tool in the closed position.

22. The byproduct collection system of claim 18, wherein the securing mount comprises at least one suction cup that is configured to removably connect to the first surface of the workpiece.

23. The byproduct collection system of claim 22, further comprising a suction generator coupled to the at least one suction cup.

24. The byproduct collection system of claim 18, further comprising a vacuum port extending from the collection shroud, wherein a vacuum channel extends through the vacuum port and a portion of the collection shroud, wherein the vacuum channel is in fluid communication with the collection chamber, and wherein the vacuum port is configured to couple to a vacuum generator.

25. A method comprising:
securing a collection shroud on a first surface of a workpiece opposite from a tool on a second surface of the workpiece;
opening a first portion of the collection shroud relative to a second portion of the collection shroud;
positioning a portion of the tool between the opened first and second portions;
closing the first and second portions around the portion of the tool; and
securing the first portion to the second portion with a latch.

* * * * *